United States Patent
Eriksson et al.

(10) Patent No.: US 12,471,159 B2
(45) Date of Patent: Nov. 11, 2025

(54) METHOD FOR CONNECTING AN INTEGRATED ACCESS BACKHAUL NODE TO OPERATION AND MAINTENANCE SYSTEM

(71) Applicant: Telefonaktiebolaget LM Ericsson (PUBL), Stockholm (SE)

(72) Inventors: Per-Erik Eriksson, Stockholm (SE); Filip Barac, Huddinge (SE); Marco Belleschi, Solna (SE); Ajmal Muhammad, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 18/001,286

(22) PCT Filed: Jun. 9, 2021

(86) PCT No.: PCT/EP2021/065542
§ 371 (c)(1),
(2) Date: Dec. 9, 2022

(87) PCT Pub. No.: WO2021/250136
PCT Pub. Date: Dec. 16, 2021

(65) Prior Publication Data
US 2023/0239942 A1    Jul. 27, 2023

Related U.S. Application Data

(60) Provisional application No. 63/037,240, filed on Jun. 10, 2020.

(51) Int. Cl.
H04W 76/14    (2018.01)
H04W 24/02    (2009.01)
H04W 88/18    (2009.01)

(52) U.S. Cl.
CPC .......... *H04W 76/14* (2018.02); *H04W 24/02* (2013.01); *H04W 88/18* (2013.01)

(58) Field of Classification Search
CPC ...... H04W 76/14; H04W 24/02; H04W 88/18
(Continued)

(56) References Cited

U.S. PATENT DOCUMENTS

| | | | |
|---|---|---|---|
| 11,343,737 B2 * | 5/2022 | Park | H04W 80/02 |
| 11,343,812 B2 * | 5/2022 | Park | H04W 72/23 |

(Continued)

FOREIGN PATENT DOCUMENTS

| | | |
|---|---|---|
| EP | 3 836 743 A1 | 6/2021 |
| WO | 2020 030146 A1 | 2/2020 |

(Continued)

OTHER PUBLICATIONS

3GPP TS 36.331 V15.8.0; 3rd Generation Partnership Project; Technical Specification Group Radio Access Network; Evolved Universal Terrestrial Radio Access (E-UTRA); Radio Resource Control (RRC); Protocol specification (Release 15)—Dec. 2019.

(Continued)

*Primary Examiner* — Melvin H Pollack
(74) *Attorney, Agent, or Firm* — Sage Patent Group

(57) ABSTRACT

A method performed by a child Integrated Access Backhaul (IAB) node that comprises a IAB-Mobile Termination, IAB-MT includes transmitting, to a network node operating as a parent node with respect to the child IAB node, a Radio Resource Control (RRC) setup request message comprising an IAB indication that indicates that the transmission to the network node is by the child IAB node comprising the IAB-MT.

21 Claims, 26 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,622,300 | B2* | 4/2023 | Byun | H04W 36/0033 |
| | | | | 370/331 |
| 11,638,166 | B2* | 4/2023 | Qi | H04W 24/10 |
| | | | | 370/252 |
| 11,736,213 | B2* | 8/2023 | Su | H04L 5/0094 |
| | | | | 370/252 |
| 11,743,815 | B2* | 8/2023 | Kim | H04W 48/14 |
| | | | | 370/329 |
| 11,812,346 | B2* | 11/2023 | Taft | H04W 88/14 |
| 11,832,320 | B2* | 11/2023 | Akl | H04W 76/12 |
| 11,903,070 | B2* | 2/2024 | Ishii | H04W 76/15 |
| 11,963,024 | B2* | 4/2024 | Jung | H04L 1/1812 |
| 11,974,213 | B2* | 4/2024 | Miao | H04L 5/0048 |
| 11,997,551 | B2* | 5/2024 | Ishii | H04W 36/12 |
| 12,010,663 | B2* | 6/2024 | Wei | H04L 5/0092 |
| 12,028,920 | B2* | 7/2024 | Jung | H04W 24/04 |
| 12,028,940 | B2* | 7/2024 | Latheef | H04W 12/06 |
| 12,035,381 | B2* | 7/2024 | Miao | H04W 76/20 |
| 12,047,829 | B2* | 7/2024 | Xu | H04W 36/32 |
| 12,063,089 | B2* | 8/2024 | Wei | H04W 24/10 |
| 12,075,476 | B2* | 8/2024 | Yao | H04W 72/1268 |
| 12,082,268 | B2* | 9/2024 | Wu | H04W 56/0015 |
| 12,096,405 | B2* | 9/2024 | Wei | H04L 5/0032 |
| 12,101,791 | B2* | 9/2024 | Wu | H04W 76/11 |
| 12,101,838 | B2* | 9/2024 | Zhu | H04W 40/02 |
| 12,150,030 | B2* | 11/2024 | Tsuda | H04W 40/12 |
| 12,150,159 | B2* | 11/2024 | Cheng | H04L 5/0035 |
| 12,150,165 | B2* | 11/2024 | Wei | H04W 74/002 |
| 12,155,602 | B2* | 11/2024 | Cha | H04L 5/0051 |
| 12,156,267 | B2* | 11/2024 | Tiirola | H04W 76/20 |
| 12,156,272 | B2* | 11/2024 | Zhu | H04L 1/1864 |
| 12,160,731 | B2* | 12/2024 | Kim | H04W 12/033 |
| 12,167,283 | B2* | 12/2024 | Luo | H04W 36/08 |
| 12,167,490 | B2* | 12/2024 | Ishii | H04W 76/19 |
| 12,192,882 | B2* | 1/2025 | Kim | H04W 76/20 |
| 12,193,094 | B2* | 1/2025 | Jung | H04W 24/10 |
| 12,200,537 | B2* | 1/2025 | Wu | H04L 47/29 |
| 12,200,797 | B2* | 1/2025 | Wu | H04W 76/19 |
| 12,207,246 | B2* | 1/2025 | Miao | H04W 72/20 |
| 12,207,289 | B2* | 1/2025 | Huang | H04W 48/16 |
| 12,213,171 | B2* | 1/2025 | Harada | H04W 76/15 |
| 12,232,176 | B2* | 2/2025 | Miao | H04W 74/002 |
| 12,238,744 | B2* | 2/2025 | Ying | H04W 72/23 |
| 12,244,456 | B2* | 3/2025 | Cirik | H04W 72/046 |
| 2022/0104110 | A1* | 3/2022 | Khanfouci | H04W 40/22 |
| 2022/0210698 | A1* | 6/2022 | Ly | H04W 40/22 |
| 2023/0125848 | A1* | 4/2023 | Novlan | H04W 88/085 |
| | | | | 370/329 |
| 2023/0142688 | A1* | 5/2023 | Wu | H04W 76/19 |
| | | | | 370/329 |
| 2023/0156505 | A1* | 5/2023 | Wu | H04W 24/10 |
| | | | | 370/242 |
| 2023/0345553 | A1* | 10/2023 | Maya | H04W 28/16 |
| 2025/0016643 | A1* | 1/2025 | Huang | H04W 36/0061 |

FOREIGN PATENT DOCUMENTS

| | | | | |
|---|---|---|---|---|
| WO | WO-2023217377 | A1 * | 11/2023 | H04W 36/00835 |
| WO | WO-2024119879 | A1 * | 6/2024 | H04W 88/085 |

OTHER PUBLICATIONS

3GPP TS 38.401 V16.1.0; 3rd Generation Partnership Project; Technical Specification Group Radio Access Network; NG-RAN; Architecture description (Release 16)—Mar. 2020.

3GPP TSG-RAN WG2#108; Reno, USA; Title: Discussion on IAB node connection setup; Source: ZTE, Sanechips (R2-1915121)—Nov. 18-22, 2019.

3GPP TSG RAN WG3 Meeting #108-e; Online; Change Request; 38.401 CR 0033 rev 20 Current version: 16.1.0; Title: BL CR to 38.401 Support for IAB (R3-203067)—Jun. 1-11, 2020.

PCT Notification of Transmittal of the International Search Report and the Written Opinion of the International Searching Authority, or the Declaration issued for International application No. PCT/EP2021/065542—Jan. 11, 2022.

* cited by examiner

METHOD FOR CONNECTING AN INTEGRATED ACCESS BACKHAUL NODE TO OPERATION AND MAINTENANCE SYSTEM

PRIORITY

This nonprovisional application is a U.S. National Stage Filing under 35 U.S.C. § 371 of International Patent Application Serial No. PCT/EP2021/065542 filed Jun. 9, 2021 and entitled "METHOD FOR CONNECTING AN INTEGRATED ACCESS BACKHAUL NODE TO OPERATION AND MAINTENANCE SYSTEM" which claims priority to U.S. Provisional Patent Application No. 63/037,240 filed Jun. 10, 2020 both of which are hereby incorporated by reference in their entirety.

TECHNICAL FIELD

The present disclosure relates, in general, to wireless communications and, more particularly, systems and methods for connecting an Integrated Access Backhaul (IAB) node to an Operation and Maintenance system (OAM).

BACKGROUND

The usage of short range mmWave spectrum in New Radio (NR) creates a need for densified deployment with multi-hop backhauling. However, optical fiber to every base station will be too costly and sometimes not even possible (e.g. historical sites). The main Integrated Access Backhaul (IAB) principle is the use of wireless links for the backhaul (instead of fiber) to enable flexible and very dense deployment of cells without the need for densifying the transport network. Use case scenarios for IAB can include coverage extension, deployment of massive number of small cells, and fixed wireless access (FWA) (e.g. to residential/office buildings). The larger bandwidth available for NR in mmWave spectrum provides opportunity for self-backhauling, without limiting the spectrum to be used for the access links. On top of that, the inherent multi-beam and Multiple Input Multiple Output (MIMO) support in NR reduce cross-link interference between backhaul and access links allowing higher densification.

During the study item phase of the IAB work, it has been agreed to adopt a solution that leverages the Central Unit (CU)/Distributed Unit (DU) split architecture of NR, where the IAB node will be hosting a Distributed Unit (DU) part that is controlled by a central unit. See 3GPP TR 38.874. The IAB nodes also have a Mobile Termination (MT) part that they use to communicate with their parent nodes.

The specifications for IAB strives to reuse existing functions and interfaces defined in NR. In particular, MT, gNodeB-DU (gNB-DU), gNodeB-CU (gNB-CU), User Plane Function (UPF), Access and Mobility Management Function (AMF) and Session Management Function (SMF) as well as the corresponding interfaces NR Uu (between MT and gNB), F1, NG, X2 and N4, which are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined as a component of the IAB node. In the context of this study, MT is referred to as a function residing on an IAB-node that terminates the radio interface layers of the backhaul Uu interface toward the IAB-donor or other IAB-nodes.

FIG. 1 illustrates a reference diagram for IAB in stand-alone mode, which contains one IAB-donor and multiple IAB-nodes. The IAB-donor is treated as a single logical node that comprises a set of functions such as gNB-DU, gNodeB-Central Unit-Control Plane (gNB-CU-CP), gNodeB Central Unit-User Plane (gNB-CU-UP), and potentially other functions. In a deployment, the IAB-donor can be split according to these functions, which can all be either collocated or non-collocated as allowed by $3^{rd}$ Generation Partnership Project (3GPP) Next Generation-Radio Access Network (NG-RAN) architecture. IAB-related aspects may arise when such split is exercised. Also, some of the functions presently associated with the IAB-donor may eventually be moved outside of the donor in case it becomes evident that they do not perform IAB-specific tasks.

FIG. 2 illustrates the general concept of the CU-DU split where the DU in the IAB node is performing the task of a base station and the MT is used to terminate the NR Uu radio protocol.

Integration of an IAB Node to IAB Network

The MT will connect to NR system as a normal UE, thus, using Synchronization Signal Block (SSB)/Physical Broadcast Channel (PBCH), Random Access Channel-Random Access Response (RACH-RAR), Radio Resource Control (RRC) connect procedure. FIG. 3, which is taken from 3GPP TS 38.401, illustrates the RRC connection procedure for a normal user equipment (UE).

The IAB-MT will follow the same procedures for the connection as in FIG. 3. When the RRCSetupComplete is transmitted the MT will send an IAB-indication that will be used by the CU to select an AMF that supports IAB.

Certain problems exist. For example, as described in the example above, which is hereby incorporated by reference in its entirety, the IAB MT in a child node will connect to the DU of the parent IAB-node as a normal UE going through the sequence of RRC messages:

MT→DU→CU: RRCSetupRequest
CU→DU→MT: RRCSetup
MT→DU→CU: RRCSetupComplete

The RRCSetupComplete message is the first message in which the IAB-MT indicates to the network that it is an IAB-MT (and not a UE). The message contains an IAB indicator in order for CU to select an IAB capable AMF, and an encapsulated Non-Access Stratum (NAS) Packet Data Unit (PDU) for authorization request destined to the AMF. Note that, at this point, the parent DU is still unaware that the connecting child node is an IAB-MT and not a UE.

FIGS. 4A-4C illustrate the registration procedure discussed in 3GPP TS 23.502. As shown in FIG. 4A, the NAS PDU is forwarded inside the INITIAL UE MESSAGE from CU to AMF. The INITIAL UE MESSAGE corresponds to step 1 in FIG. 4 ("Registration Request").

After the above described procedure, authorization/authentication and then Access Stratum (AS) security follows, as depicted in steps 6, 7, and 9 of FIG. 4A. For the authentication/authorization and AS security it is assumed that either Universal Subscriber Identity Module (U-SIM) or Extensible Authentication Protocol-Transport Layer Security (EAP-TLS) certificates are used.

For the EAP-TLS authentication/authorization, a security certificate typically needs to be in place when the core network starts the authorization/authentication process. However, it cannot always be assumed that such certificate is hard-coded into the IAB Node. In some cases, the certificate is downloaded from Operation and Maintenance system (OAM) when the node has connection to the OAM. It should be noted that UEs do not connect to OAM.

An IAB node can connect to the OAM client at parent DU via Back Haul (BH) Radio Link Control (RLC) channels between the parent DU and the IAB node. When an IAB-MT of an IAB node tries to connect to the network, the parent DU will not know, until step 9 in FIG. 3, at the earliest, whether it is an IAB node or a UE that is trying to connect. With respect to 'at the earliest', there are two options:

The UE CONTEXT SETUP REQUEST message from the donor CU may carry the configurations to set up one or more BH RLC channels from parent DU to IAB node. Based on the BH RLC channels being set up, the parent DU can conclude that an IAB node is connecting. However, since this message carries the SecurityModeCommand (to be delivered to the IAB-MT via RRC), this means that it may be too early to establish BH RLC channels towards the IAB-MT at this stage, since the authentication/authorization process has not yet been completed.

Another alternative would be that the BH RLC channels are set up at a later stage (e.g. after authentication/authorization process is over), meaning that the parent DU can become aware of IAB node connecting later than step 9.

The above means that, according to the IAB specs, the BH channels from parent DU to the IAB-MT will not be established before step 9 in FIG. 3. Moreover, according to the current IAB specification, an IAB node will not be able to connect to OAM and ask for a certificate before the RRCReconfiguration (step 15 in FIG. 3). This message carries the BAP configuration for the IAB-MT, including the BAP address assigned to IAB-MT, without which the IAB node cannot send uplink (UL) messages on the backhaul. In other words, the BH RLC channels for carrying OAM messages to/from IAB node cannot be set up prior to IAB-MT receiving RRCReconfiguration (step 15 in FIG. 3). There is no signaling mechanism enabling the connecting child-MT to ask for an OAM connection.

On the other hand, as discussed above, the authentication/authorization process starts after the IAB node sends RRCSetupComplete (step 5 in FIG. 3). However, the EAP-TLS/USIM certificate is necessary for authentication/authorization process, and, if it is not hard-coded, it needs to be downloaded from the OAM client at parent DU prior to step 5 in FIG. 3.

SUMMARY

Certain aspects of the present disclosure and their embodiments may provide solutions to these or other challenges. For example, according to certain embodiments, a method is provided for an Integrated Access Backhaul (IAB) node to connect to OAM and obtain the security certificate prior to authorization/authentication and Access Stratum (AS) security initiation from the Core Network (CN).

According to certain embodiments, a method performed by a child IAB node that comprises a IAB-Mobile Termination (IAB-MT) includes transmitting, to a network node operating as a parent node with respect to the child IAB node, a Radio Resource Control (RRC) setup request message comprising an IAB indication that indicates that the transmission to the network node is by the child IAB node comprising the IAB-MT.

According to certain embodiments, a child IAB node that comprises a IAB-Mobile Termination (IAB-MT) includes processing circuitry configured to transmit, to a network node operating as a parent node with respect to the child IAB node, a RRC setup request message comprising an IAB indication that indicates that the transmission to the network node is by the child IAB node comprising the IAB-MT.

According to certain embodiments, a method performed by a network node operating as a parent node with respect to a child IAB node includes receiving, from the child IAB node, a RRC setup request message comprising an IAB indication that indicates that the transmission to the network node is by the child IAB node comprising a IAB-MT.

According to certain embodiments, a network node operating as a parent node with respect to a child IAB node includes processing circuitry configured to receive, from the child IAB node, a RRC setup request message comprising an IAB indication that indicates that the transmission to the network node is by the child IAB node comprising a IAB-MT.

According to certain embodiments, a method performed by a network node operating as a parent node with respect to a child IAB node includes receiving, from the child IAB node, a message associated with a Radio Access Channel (RACH) procedure. The message uses at least one RACH resource configured for an IAB node. Based on the message using the at least one RACH resource configured for the IAB node, the network node determines that the message to the network node is by the child IAB node comprising a IAB-MT.

According to certain embodiments, a network node operating as a parent node with respect to a child IAB node includes processing circuitry configured to receive, from the child IAB node, a message associated with a RACH procedure. The message uses at least one RACH resource configured for an IAB node. Based on the message using the at least one RACH resource configured for the IAB node, the processing circuitry is configured to determine that the message to the network node is by the child IAB node comprising a IAB-MT.

Certain embodiments may provide one or more of the following technical advantages. For example, one technical advantage may be that certain embodiments ensure that IAB nodes without U-SIM or EAP-TLS certificates can download these certificates prior to registration towards the network.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
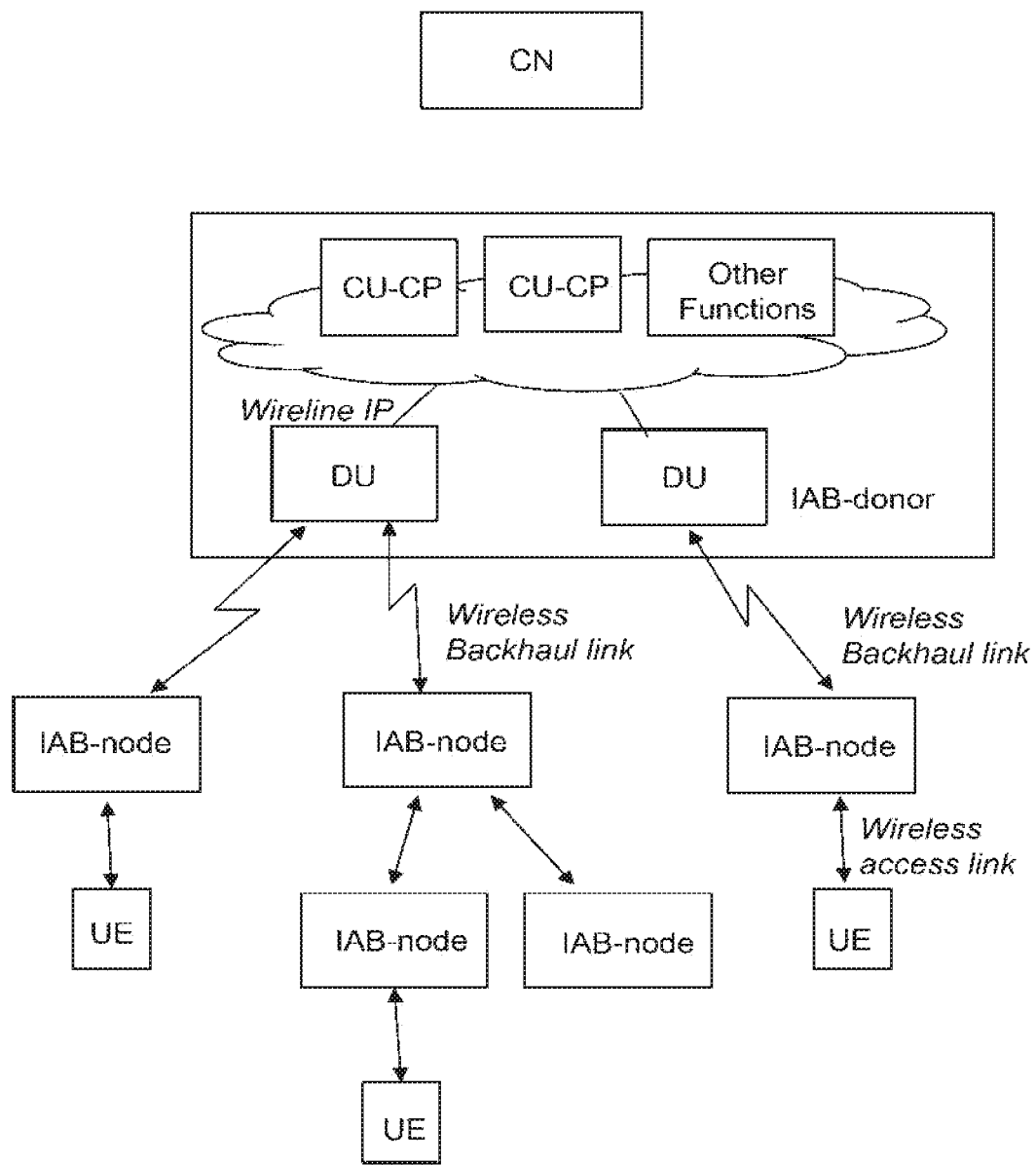
FIG. 1 illustrates a reference diagram for IAB in stand-alone mode, which contains one IAB-donor and multiple IAB-nodes.
Figure 2:
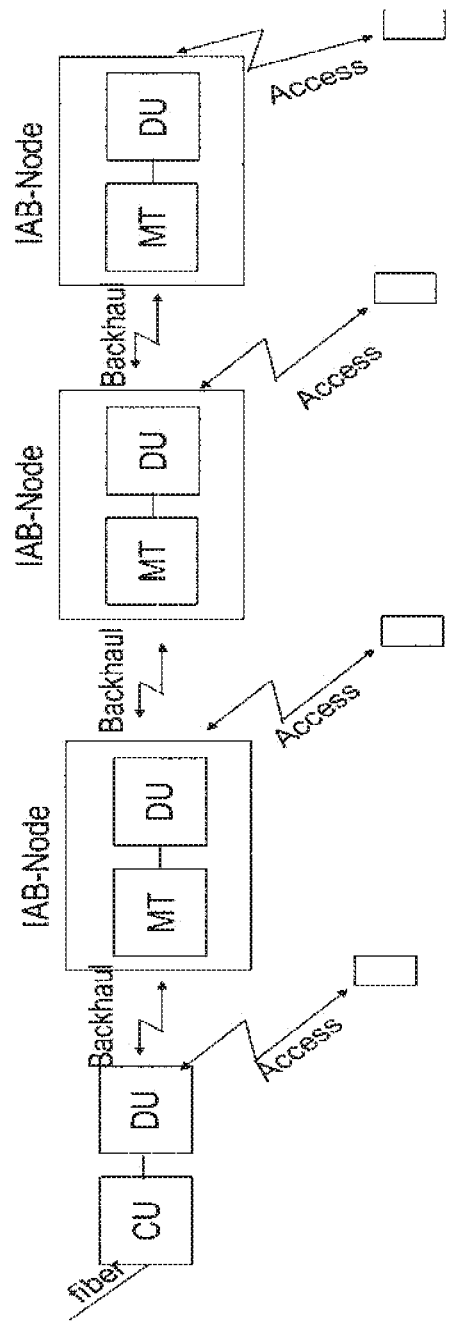
FIG. 2 illustrates the general concept of the CU-DU split.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), O&M, Operations Support System (OSS), Self Organizing Network (SON), positioning node (e.g. Evolved Serving Mobile Location Center (E-SMLC)), Minimization of Drive Test (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services UE (ProSe UE), Vehicle-to-Vehicle UE (V2V UE), Vehicle-to-Anything UE (V2X UE), etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

As used herein,

The terms child IAB-MT, IAB-MT and IAB-node are used interchangeably.

The terms backhaul channel (BH) and BH Radio Link Channel (BH RLC channel) are used interchangeably.

The terms Central Unit (CU) and Donor CU are used interchangeably.

Figure 5:
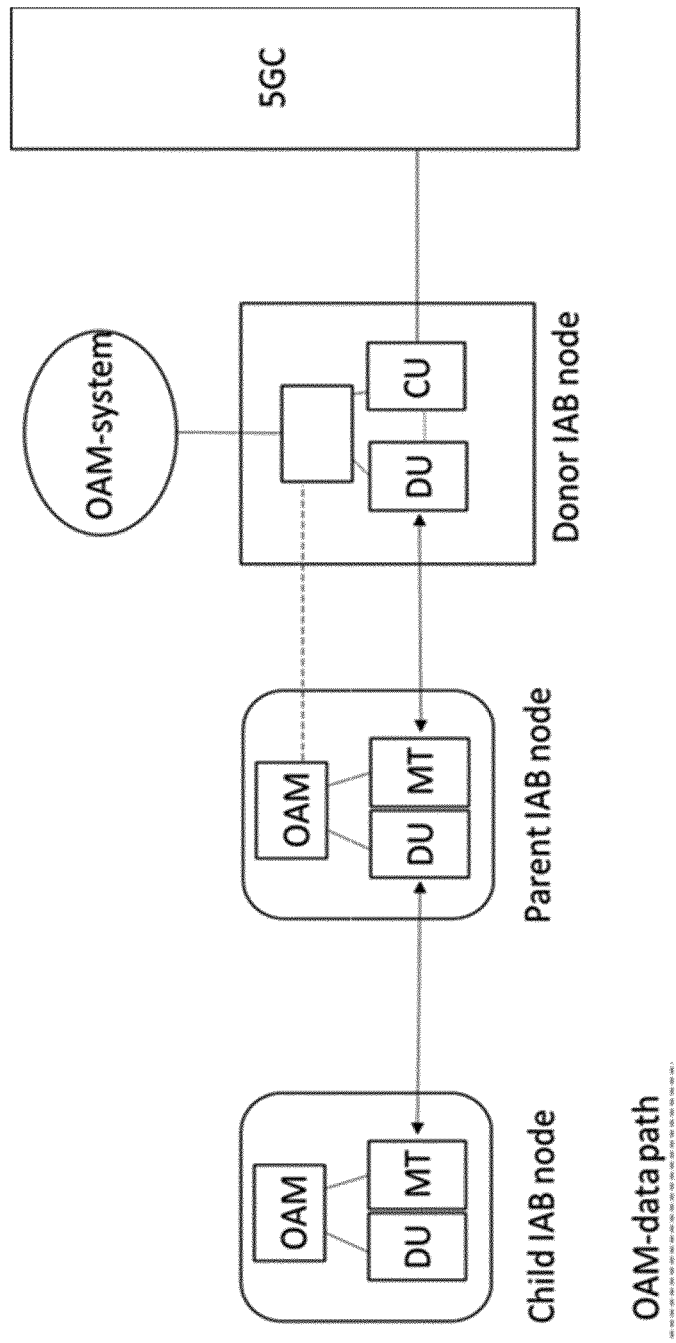
FIG. 5 illustrates an IAB network where the IAB donor CU and DU are connected to the OAM system.

FIG. 5 illustrates an IAB network, where the IAB donor CU and DU are connected to the OAM system. There is also an OAM-client in each IAB node, which manages the communication with the OAM system. The OAM client is connected to the OAM system via backhaul channels. The typical role of OAM system is to control, configure, download/update software for the individual IAB nodes and donor node. Alarms and traffic counter information are often sent over the OAM-channels.

When an IAB-MT in a child IAB node tries to connect to a parent DU, the parent DU will not know it is an IAB node until the RRCReconfiguration message, where the IAB authorization is acknowledged. As mentioned above, solutions, systems, and techniques provided herein propose a method for the IAB node to connect to OAM and obtain the security certificate prior to authorization/authentication and AS security initiation from the CN.

How to Detect the IAB-MT

According to certain embodiments, which may be referred to as Option 1 herein, the parent DU may snoop (i.e. inspect) the RRC messages received from the child-MT. If the iab-indicator IE is found therein, which will be the case when the child MT transmits the RRCSetupComplete (the message in step 5 in FIG. 3), the parent DU understands that the UE that is connecting is an IAB-MT. This knowledge could trigger the OAM client in the IAB parent to add one path to its OAM-channel for the new child IAB node. The OAM client in the IAB node will then trigger the OAM connected to the IAB donor to configure a BH RLC channel for the OAM traffic between the parent DU and the connecting child IAB-MT and possibly also to request the parent DU to reserve radio resources to be used for OAM connection. For example, the OAM related traffic can be provided to the IAB-MT using the already established SRB0 or SRB1 channel Alternatively, the CU upon receiving indication from the OAM connected to the IAB donor, may trigger a message to configure a BH RLC channel between the parent DU and the child IAB-MT for the exchange of OAM-related info, e.g. via the RRC UL/DL Information Transfer message. Then, via a secure protocol configuration, data can be downloaded to the child node. Example of this data could be operator information for the EAP-TLS. Identification of the different OAM clients can be done by the IP address to the OAM client.

Figure 6:
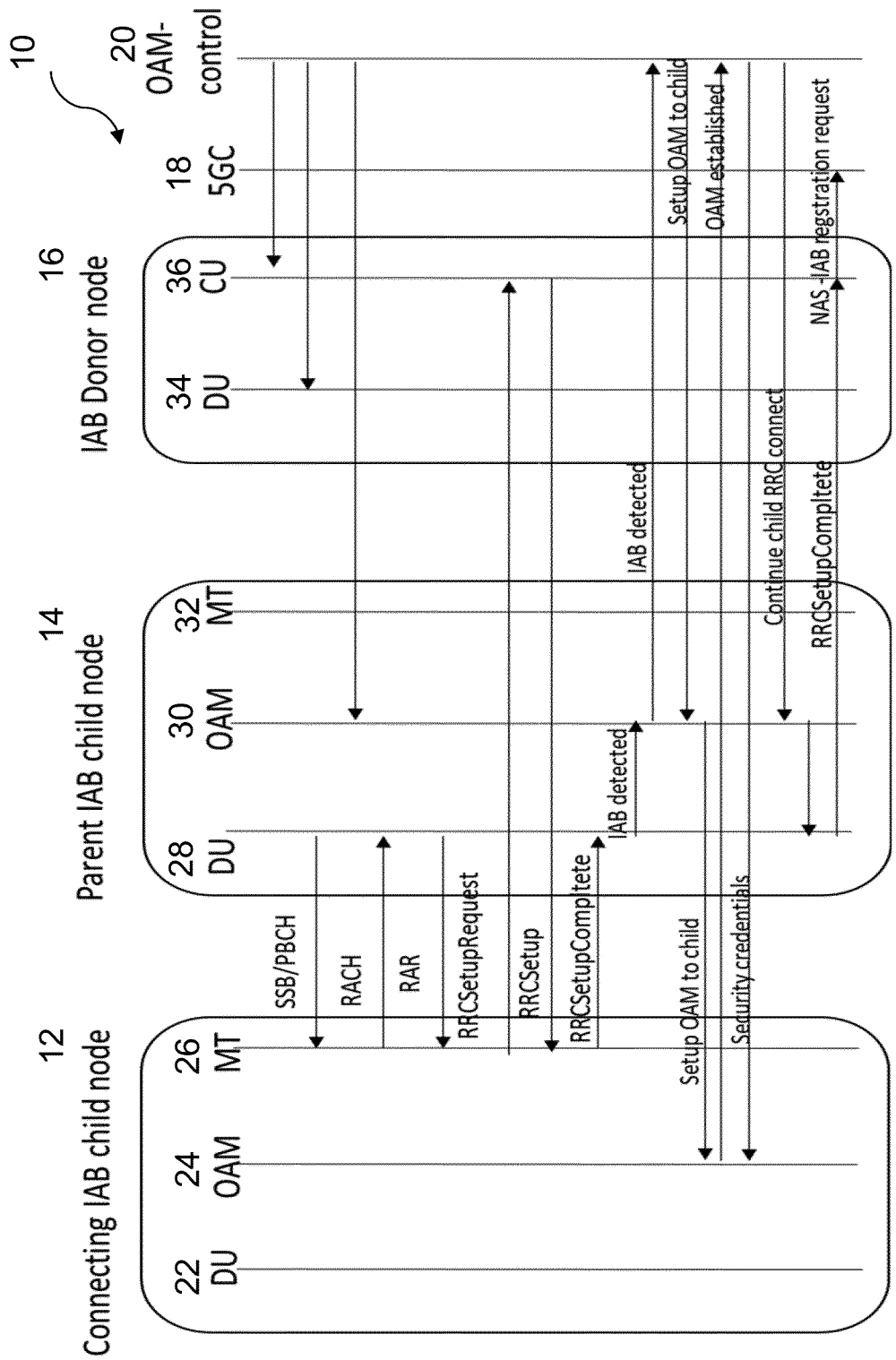
FIG. 6 illustrates an example signaling exchange for IAB-MT child detection by inspection of RRCSetupComplete in the DU, according to certain embodiments.

After the proper authorization/authentication is done, the OAM configures the IP addresses for the child IAB node and set up the connection to the Security Gateway (SeGW). After that, the child IAB node can download the necessary F1 pre-configuration data to prepare for the F1-setup. FIG. 6 illustrates an example signaling exchange 10 for IAB-MT child detection by inspection of RRCSetupComplete in the DU, according to certain embodiments. Specifically, FIG. 6 shows the signaling between a connecting IAB child node 12, a parent IAB child node 14, an IAB Donor node 16, 5GC 18, and OAM-control 20. Connecting IAB child node 12 includes a DU 22, an OAM 24, and a MT 26. Parent IAB child node 14 includes a DU 28, an OAM 30, and a MT 32. IAB Donor node includes DU 34 and CU 36.

Figure 3:
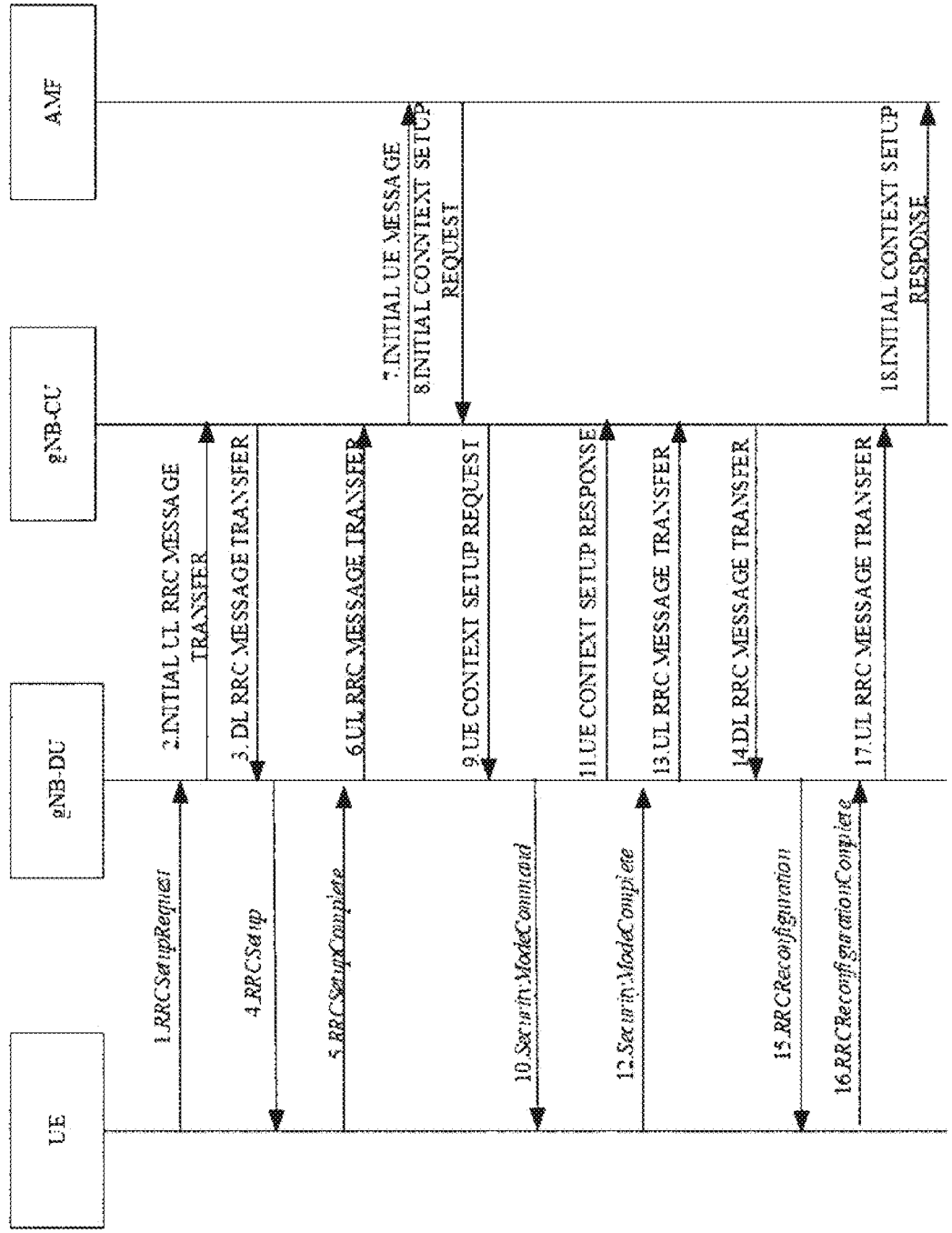
FIG. 3 illustrates the RRC connection procedure for a normal UE.
Figure 4A:
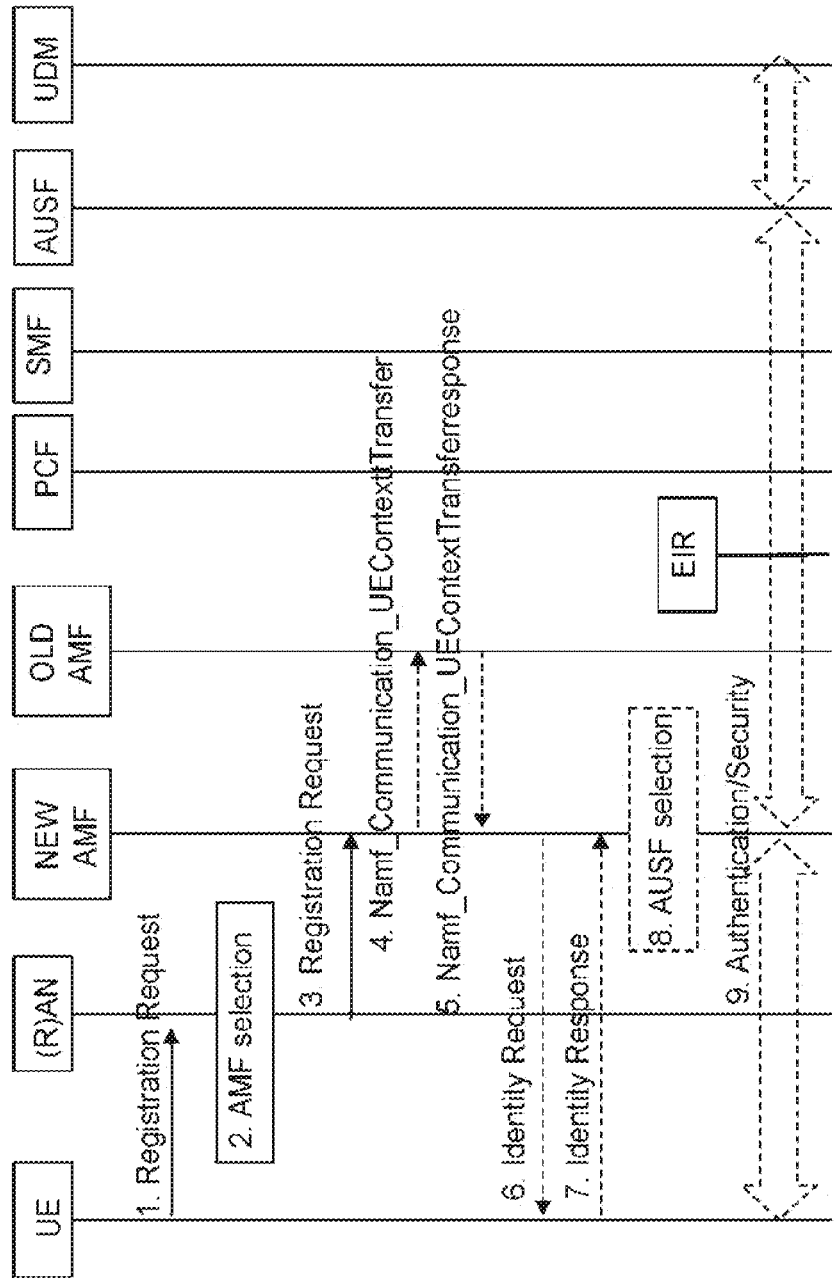
FIGS. 4A-4C illustrate the registration procedure.
Figure 4B:
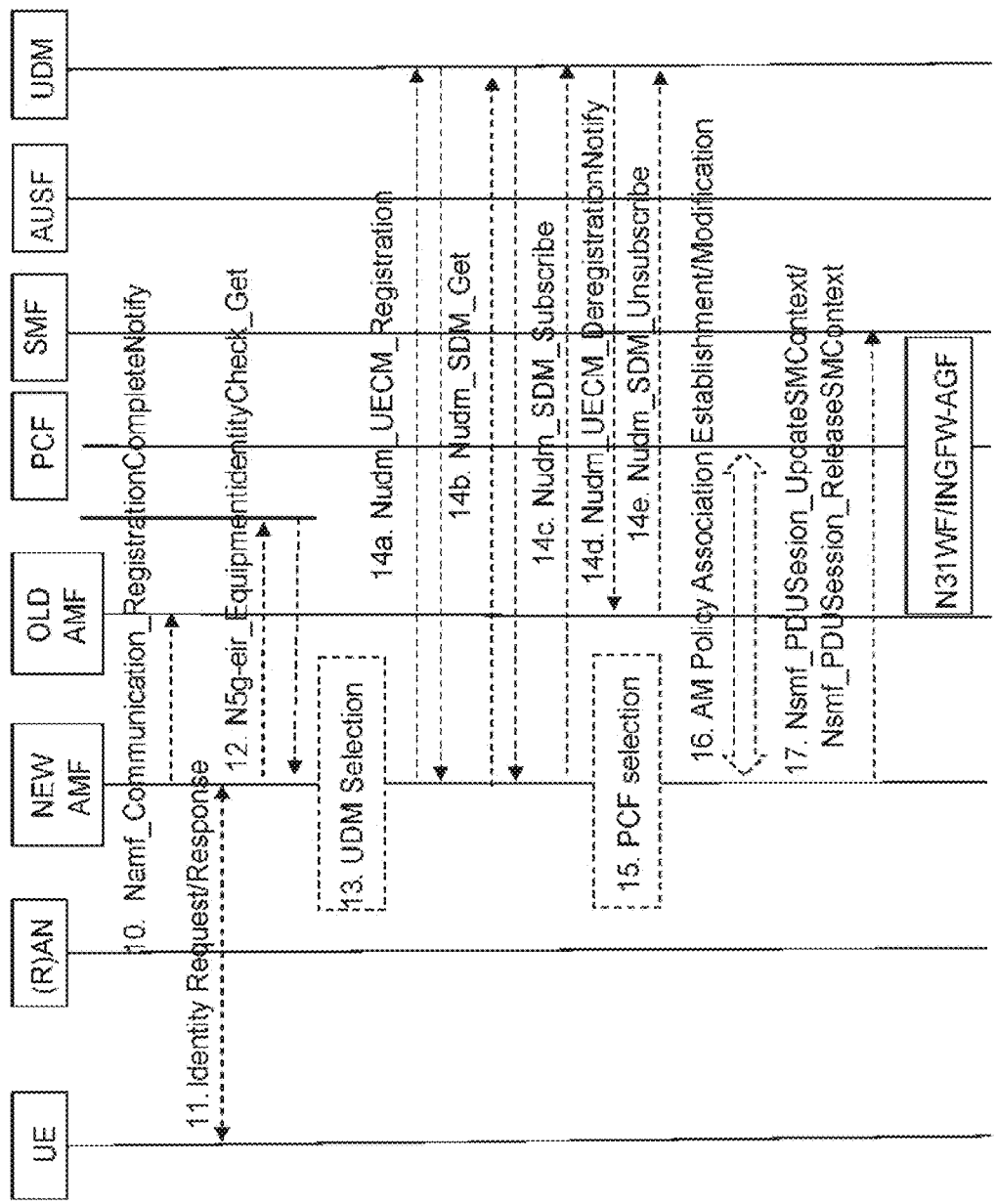
Figure 4C:
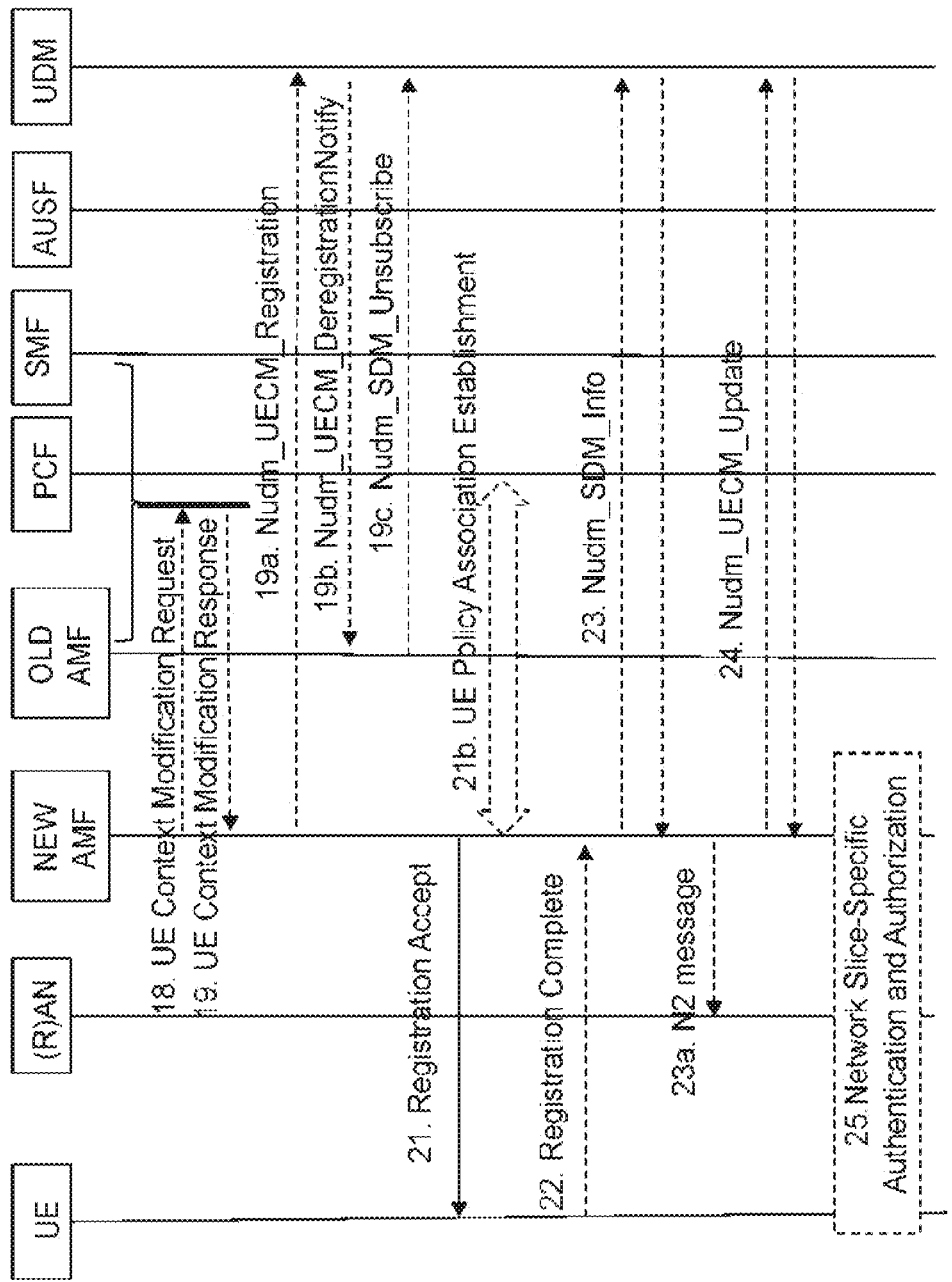
Figure 7:
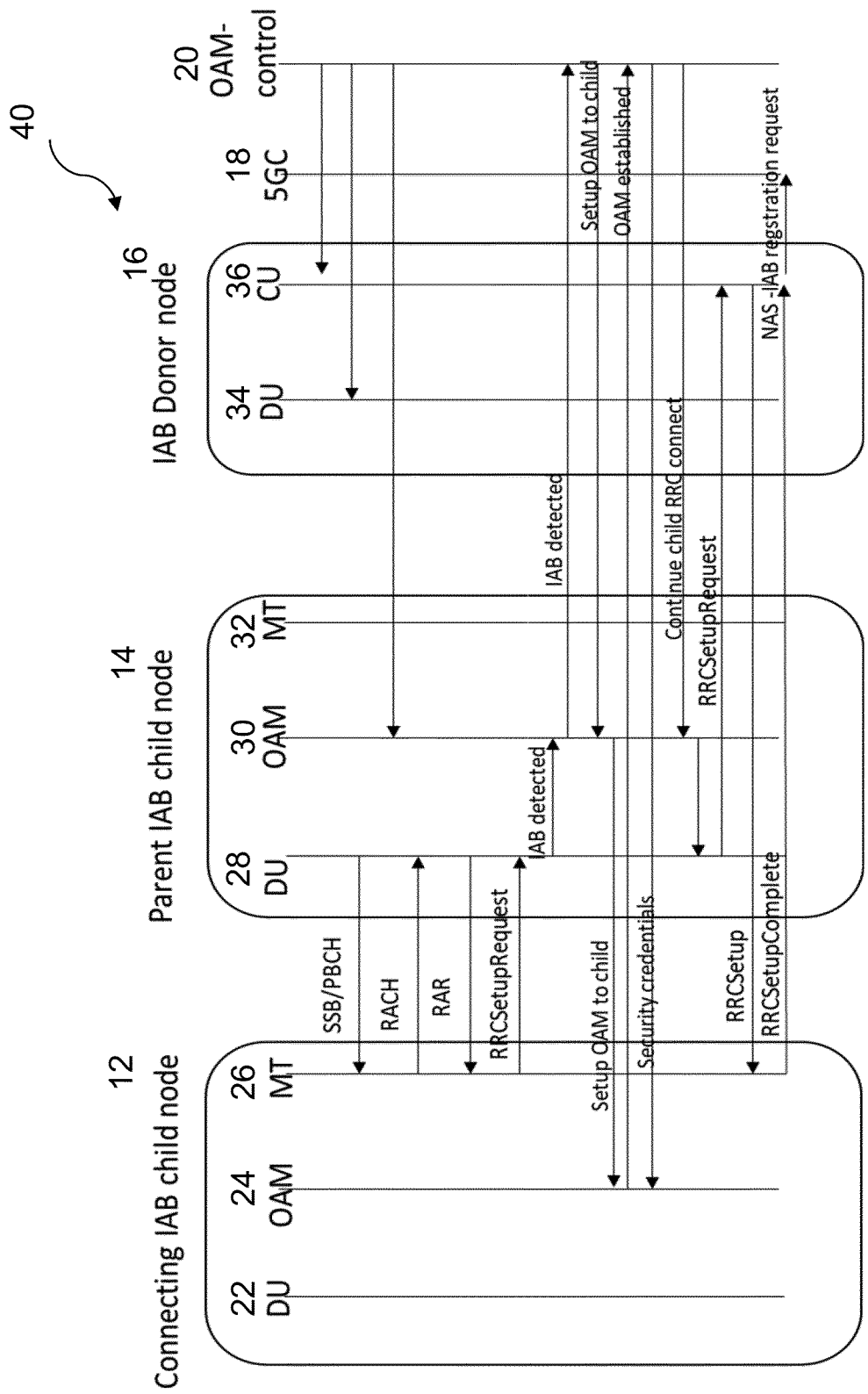
FIG. 7 illustrates an example signaling exchange for IAB-MT child detection by inspection of RRCSetupRequest in DU, according to certain embodiments.

According to certain other embodiments, which may be referred to as Option 2 herein, the RRC message in step 1 in FIG. 3, RRCSetupRequest introduces a new establishment cause with some new parameter like "iab-connection". FIG. 7 illustrates an example signaling exchange 40 for IAB-MT child detection by inspection of RRCSetupRequest in DU 28, according to certain embodiments. In some aspects, the RRCSetupRequest may be considered as transmitted from the IAB child node to the CU 36, via the DU 28. The parent DU 28 receives the RRC message, e.g. RRCSetupRequest, and reads or processes the message to determine information on whether the connecting node is an IAB-MT (i.e. IAB node), in contrast to a wireless device (UE). As a further or later step, the parent IAB node 14 sends the RRCSetupRequest message to the IAB donor node, i.e. CU 36.

If the DU of the parent IAB child node 14 is snooping (i.e. reading or receiving) the RRC messages, it could already at this early stage in the RRC message exchange initialize the same procedure as in the Option 1. In such case, the RRCSetup message can be used to convey the OAM-related information. Alternatively, one of the current spare bits in the RRCSetupRequest may be used to indicate that the provision of security certificate for the IAB-MT is necessary. The need for this security certificate may also be included in any other RRC message by the connecting child IAB node 12, upon entering connection establishment mode.

According to still other embodiments, which may be referred to as Option 3 herein, parent DU 28 inspection of the RRC messages may be avoided, but rather the donor CU 36, upon receiving an IAB indication in an UL RRC message (e.g. the existing IAB RRC flag, or new establishment cause, or flag indicating that provisioning of security certificate is needed for this IAB node 12 (the donor CU 36 has a RRC connection with IAB-MT 26 and has access to RRC message content), either:

sets up the BH RLC channel between the parent DU 28 and the child IAB node 12, which can be used for downloading the security certificate to the child IAB node 12 (as in option 1), or obtains the IAB-MT's security certificate from the parent IAB-DU 14 or IAB-donor-DU 34 (via F1 signalling), and sends the certificate to the IAB-MT 26 via RRC.

Figure 8:
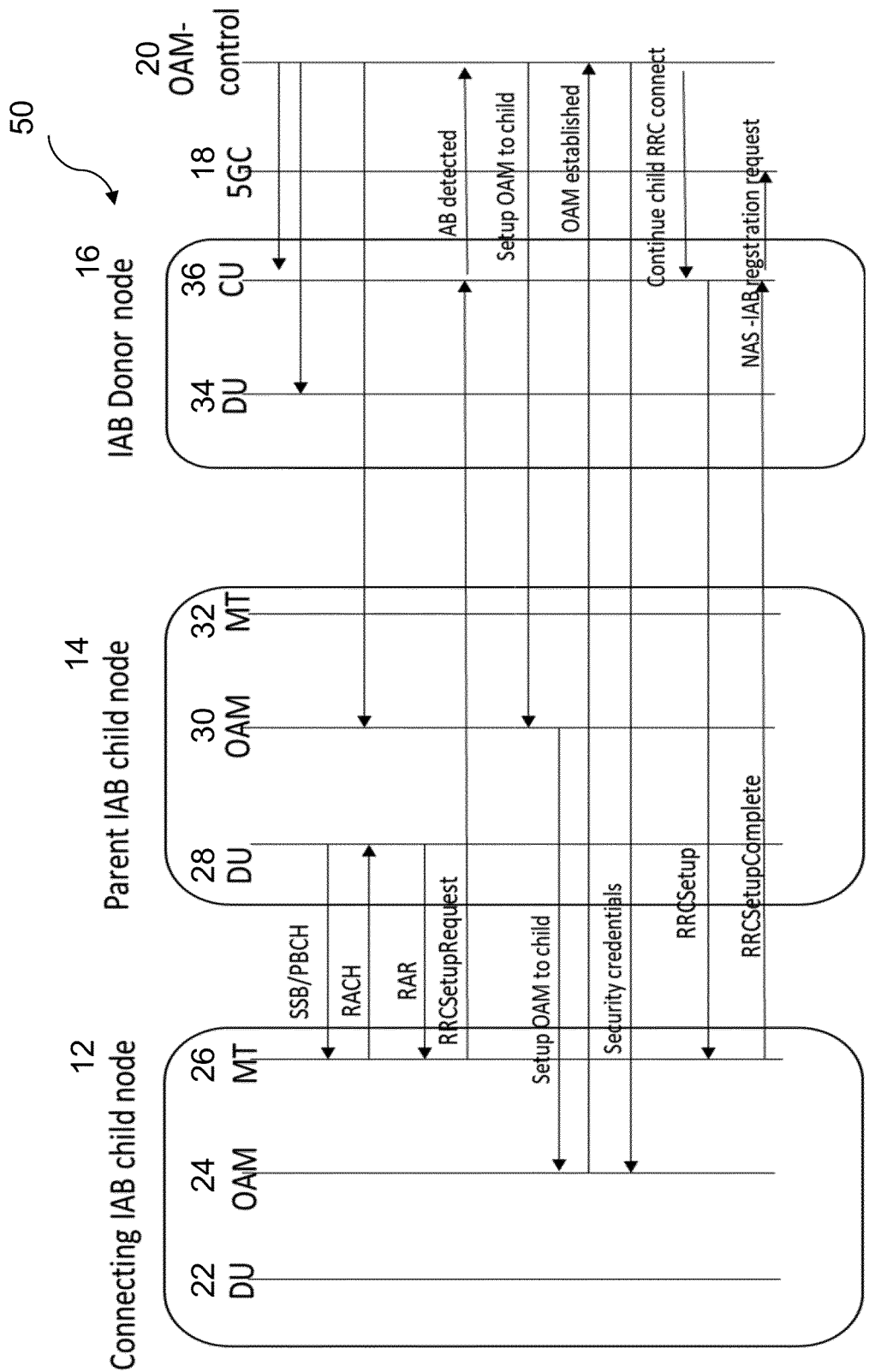
FIG. 8 illustrates an example signaling exchange for IAB-MT child detection by receiving of RRCSetupRequest in the CU, according to certain embodiments.
Figure 9:
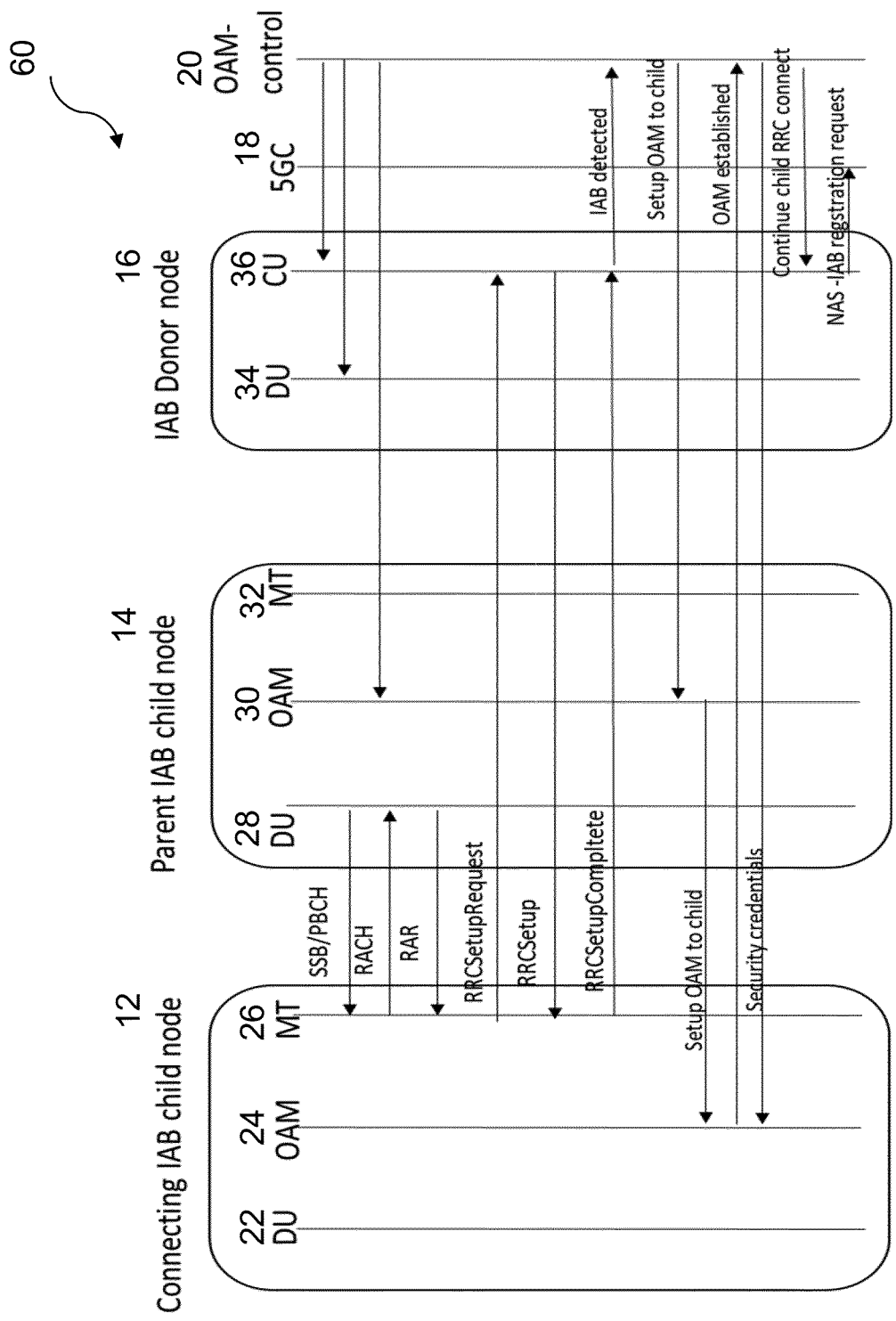
FIG. 9 illustrates an example signaling exchange for IAB-MT child detection by receiving of RRCSetupComplete in the CU, according to certain embodiments.

FIG. 8 illustrates an example signaling exchange 50 for IAB-MT child detection by receiving of a RRCSetupRequest in the CU, according to certain embodiments. FIG. 9 illustrates an example signaling exchange 60 for IAB-MT child detection by receiving of RRCSetupComplete in the CU, according to certain embodiments.

According to certain other embodiments, which may be referred to as Option 4 herein, when the parent cell served by the parent DU to which the child IAB connects, only the IAB nodes are allowed to connect (the legacy UEs are barred from the cell). In this case, since only IAB-MTs can connect to the cell, the mere reception of an RRCSetupRequest is an automatic indication to the donor CU (which can then invoke the parent DU and donor DU) that it is an IAB node trying to connect, which triggers the same procedure as in Option 1 or Option 3.

According to certain other embodiments, which may be referred to as Option 5 herein, the parent DU determines whether the device performing random access is using RACH resources configured for IAB nodes or not. If the device that is performing random access is using RACH resources configured for IAB nodes, the parent DU either:

identifies this device as an IAB node and applies the same procedure as in Option 1, or identifies this device as an IAB node, and, similar to Option 3, sends the security certificate to CU, which sends it to the IAB-MT via RRC.

In the above options, the IAB indication can be a "generic" indication that the connection is established for an IAB node (which implies that the procedure in Option 1 or Option 3 is necessary). Alternatively, an explicit indication can be introduced, to inform the donor node that the security certificate is not hard-coded in the IAB node and, hence, needs to be downloaded prior to authorization/authentication and AS security initiation from the CN. The first stage of certain embodiments disclosed herein covers how the parent node DU can detect that the connecting IAB-MT is an IAB-MT and not an access UE. As described above, there may be five different options for such a detection.

Figure 10:
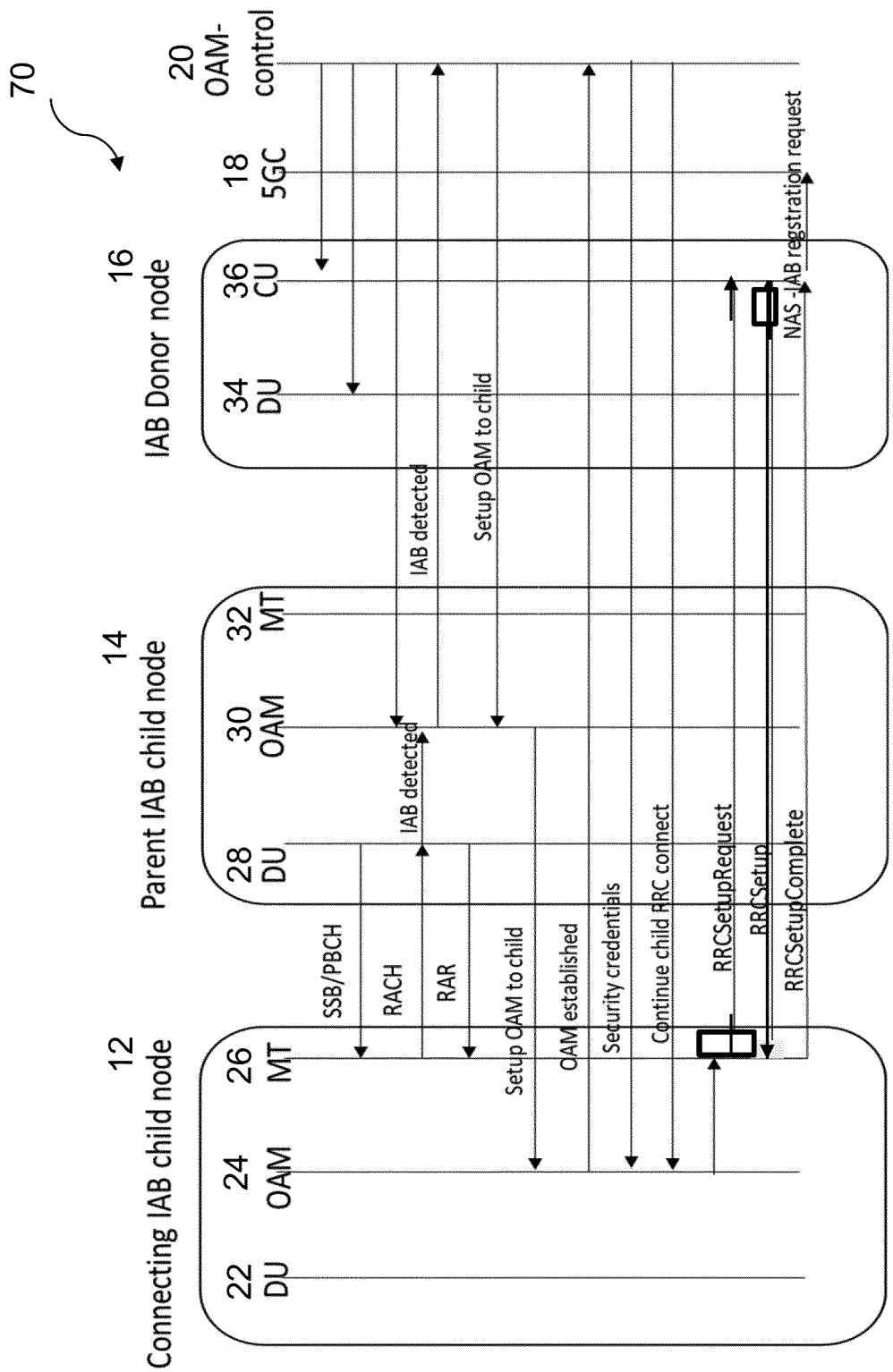
FIG. 10 illustrates an example signaling exchange for IAB-MT child detection based on IAB specific RACH or cell barring status, according to certain embodiments.

In still other embodiments, which are described in more detail below, detection of the IAB-MT child may be based RACH. FIG. 10 illustrates an example signaling exchange 70 for IAB-MT child detection based on IAB specific RACH or cell barring status, according to certain embodiments.

According to certain embodiments, the following steps may be followed:

1. The parent DU 28 detects that the connecting UE 12 is an IAB-MT, as described above with respect to Options 1 and 2 and FIGS. 6 and 7.
2. If the detection method that the parent DU 28 adopts to search for some IAB-indication in either RRCSetupRequest or RRCSetupComplete then:
   a. The parent DU 28 holds the RRC message (does not send it to the CU 36) and initiates the setup of an OAM backhaul-channel with the child IAB node 12.
      i. The OAM client 30 of the parent IAB node 14 will establish a new logical path from the OAM-system 20 of the donor node to OAM client 30 of the parent IAB node 14.
      ii. The OAM client 30 of the parent IAB node 14 will set up a connection through the parent DU 28 to the connecting child IAB-MT 26 according to any of the following methods:
         1. The time frequency resources used for SRB0 or SRB1 could be used for this connection between the child IAB-MT 26 and the DU 28 of the parent IAB node 14.
         2. The DU scheduler in the parent IAB node 14 could be configured to allocate physical resources for the OAM channel to the child IAB node 12. By using a value for a Logical Channel ID (LCID) that is reserved only for OAM, the child IAB-MT 26 will know that this traffic should be forwarded to the OAM-client.
      iii. The OAM client 24 in the child IAB node 12 receives the data corresponding to U-SIM or EAP-TLS information that will be used when the network makes the authorization request towards the connecting child IAB-MT.
      iv. The OAM client 24 in the IAB child node 12 acknowledges with the OAM client 30 of the parent node 14 about the reception of the certificate
   b. When the OAM client 30 in the parent IAB node 14 gets the acknowledgement from the OAM client 24 in the child IAB node 12, this will trigger the parent DU 28 to send/forward the RRCSetupComplete or RRCSetupRequest messages (depending on what method is used to detect if the connecting device is an IAB-MT) to and from the donor CU 36.
3. Else, if the IAB-MT detection method is that the CU 36 detects the IAB indication in the RRCSetupComplete or in the RRCSetupRequest, such as described above with regard to Option 3 and FIGS. 8 and 9:
   a. The CU 36 holds the message and does not send/forward it to the selected AMF.
   b. For the next step, there are two alternatives:
      i. Either the OAM system of the donor node 16 sends a message to the OAM client 30 of the parent IAB node 14 (for the connecting IAB-MT) indicating to prepare/establish an OAM connection with the child IAB node 12.
         1. The OAM client 30 of the parent IAB node 14 will set up a connection through the parent DU 28 to the connecting child IAB-MT 26. The time frequency resources used for SRB0 or SRB1 could be used for this connection between the IAB-MT child 12 and the DU 28 of the parent IAB node 14. To this end, the UL/DL Information Transfer message can be used to convey information related to OAM connection.
      ii. Alternatively, the CU 36 may obtain the certificate for the IAB-MT from the OAM client 30 in parent DU 28 (e.g. using a new or existing F1 message), and send via the RRC this certificate to the IAB-node 12, using an existing or a new RRC message.
   c. The OAM client 24 in the child IAB node 12 receives the data corresponding to U-SIM or EAP-TLS information that will be used when the network makes the authorization request toward the connecting child IAB-MT.
   d. When the OAM system 30 in the parent node 14 gets the acknowledgement from the OAM client 24 of the child IAB node 12, this will trigger the CU 36 to continue to do the registration request of the IAB-MT towards the core network 18 or to respond with RRCSetup (if the detection of IAB was made on the RRCSetupRequest message) to the connecting IAB child node 12.
4. Else, if the detection method is based on that barring info in SIB-1 can be set to barring legacy UEs or that IAB-MT 26 only will use IAB-RACH then, Options 4 and 5, as shown in FIG. 10:
   a. The parent DU 28 holds the RRC message (does not send it to the CU 36) and initiates the setup of an OAM backhaul-channel to the IAB-MT 26.
      i. The OAM client 30 of the parent IAB node 14 will establish a new logical path from the OAM-system of the donor node 34 to OAM client 30 of the parent IAB node 14.
      ii. The OAM client 30 of the parent IAB node 14 will setup a connection through the parent DU 28 to the connecting child IAB-MT 26.
         1. The time frequency resources used for SRB0 or SRB1 could be used for this connection between the IAB-MT child 26 and the DU 28 of the parent IAB node 14.
   b. The OAM client 24 in the child IAB node 12 receives the data corresponding to U-SIM or EAP-TLS information that will be used when the network makes the authorization request toward the connecting child IAB-MT 26.
   c. When the OAM client 30 in the of parent IAB node 14 gets the acknowledgement from the OAM client 24 in the child IAB node 12, this will trigger the parent DU 28 to continue to send the RRCSetupComplete or RRCSetupRequest (depending on what method is used to detect if the connecting device is an IAB-MT) towards the donor CU 36.

Figure 11:
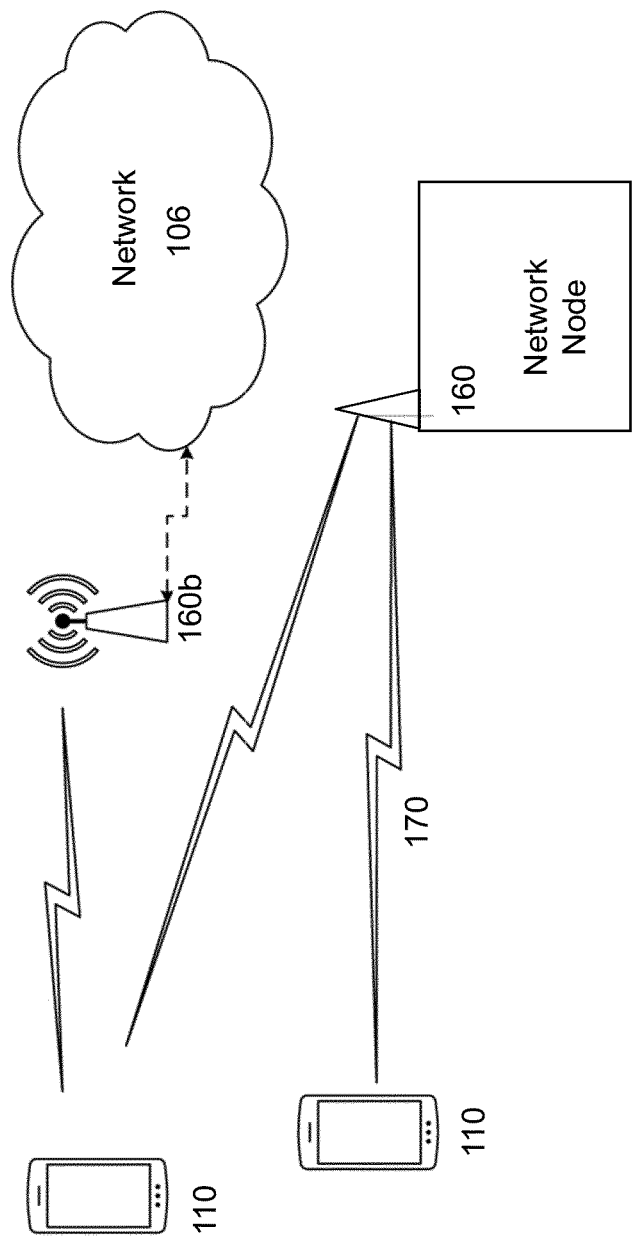
FIG. 11 illustrates an example wireless network, according to certain embodiments.

FIG. 11 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 12:
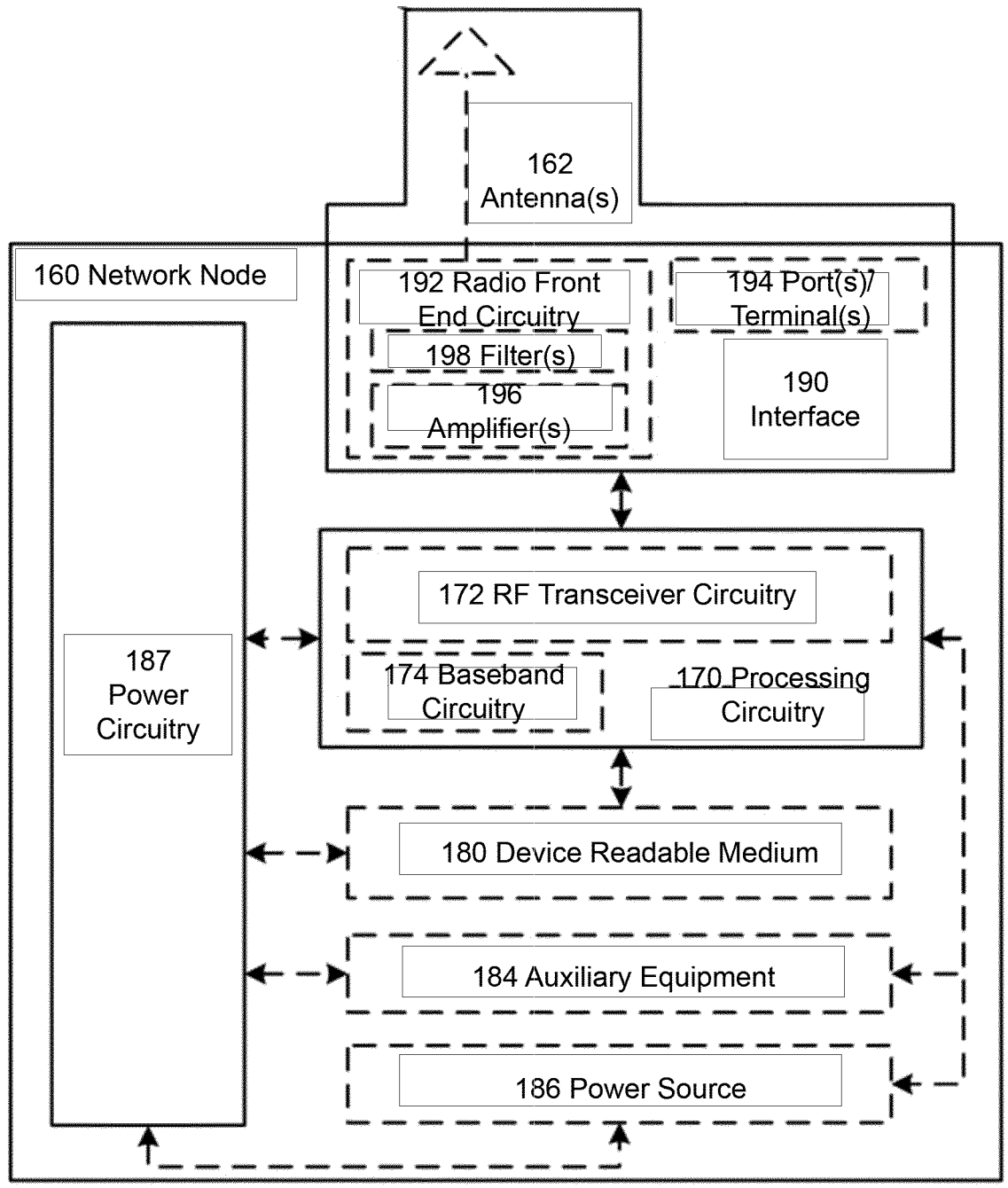
FIG. 12 illustrates an example network node, according to certain embodiments.

FIG. 12 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 160 includes processing circuitry 170, device readable medium 180, interface 190, auxiliary equipment 184, power source 186, power circuitry 187, and antenna 162. Although network node 160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wideband Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 12 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 13:
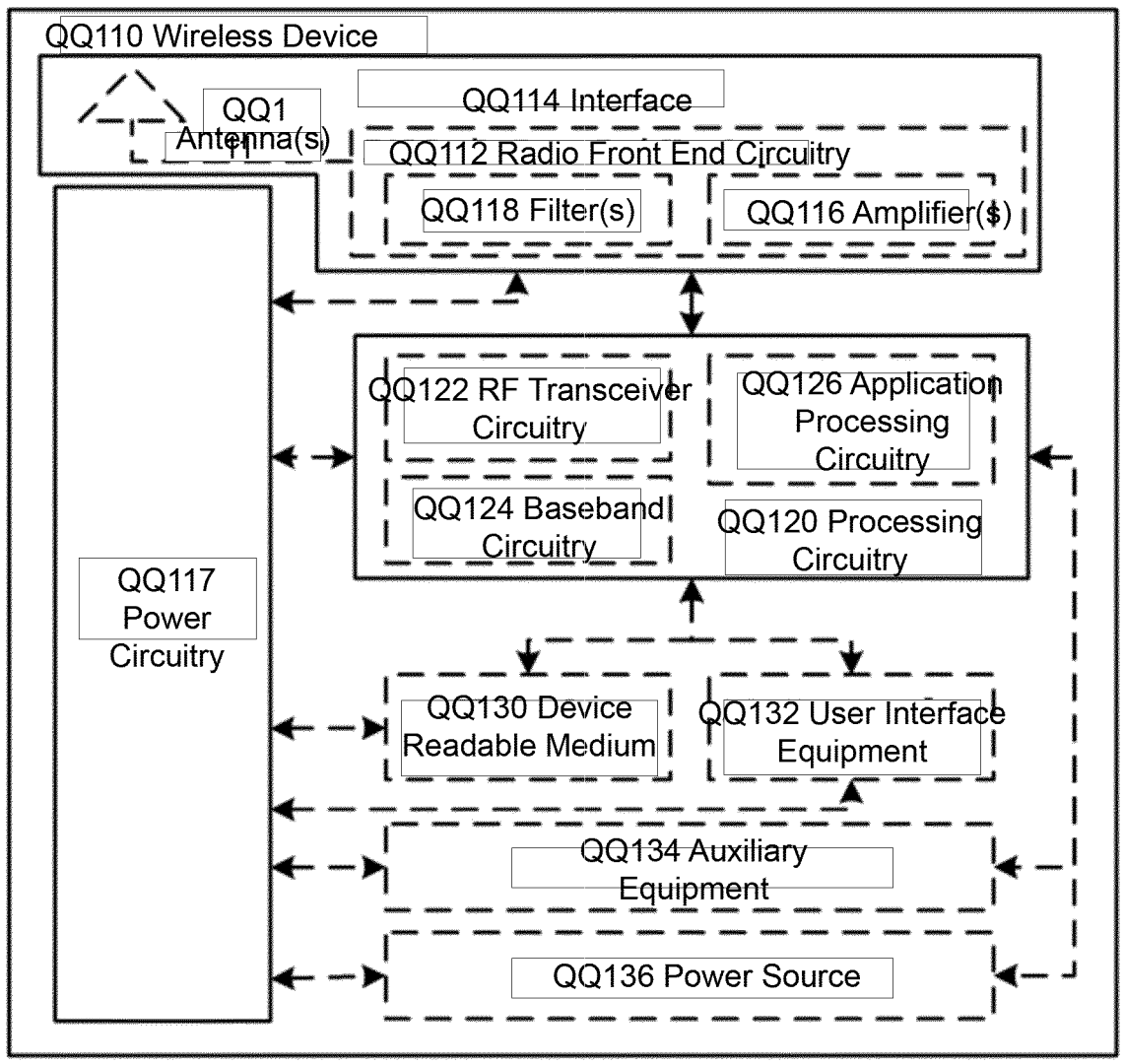
FIG. 13 illustrates an example wireless device, according to certain embodiments.

FIG. 13 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 14:
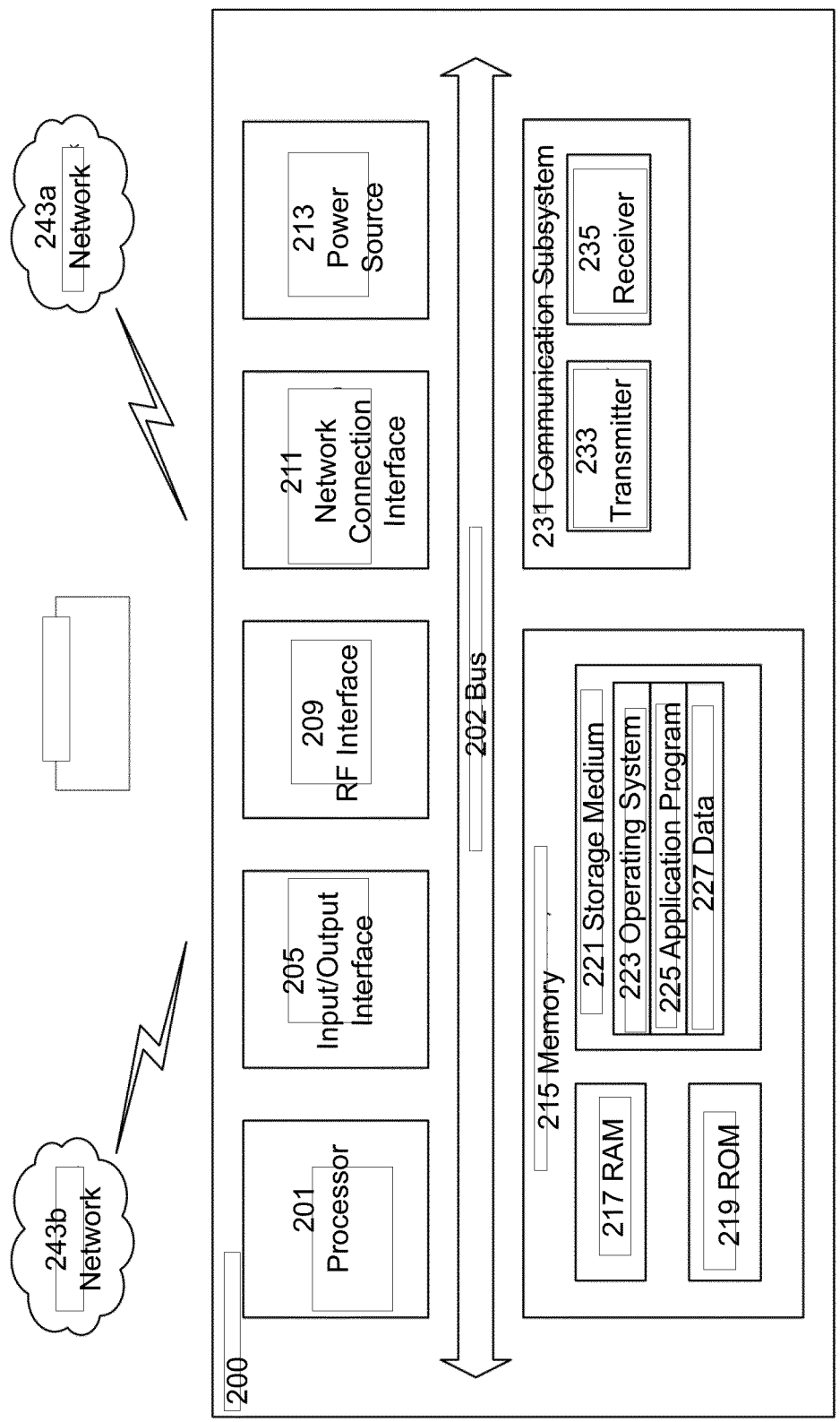
FIG. 14 illustrate an example user equipment, according to certain embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 12, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 14 is a UE, the components discussed herein are equally applicable to a wireless device, and vice-versa.

In FIG. 14, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 14, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 15:
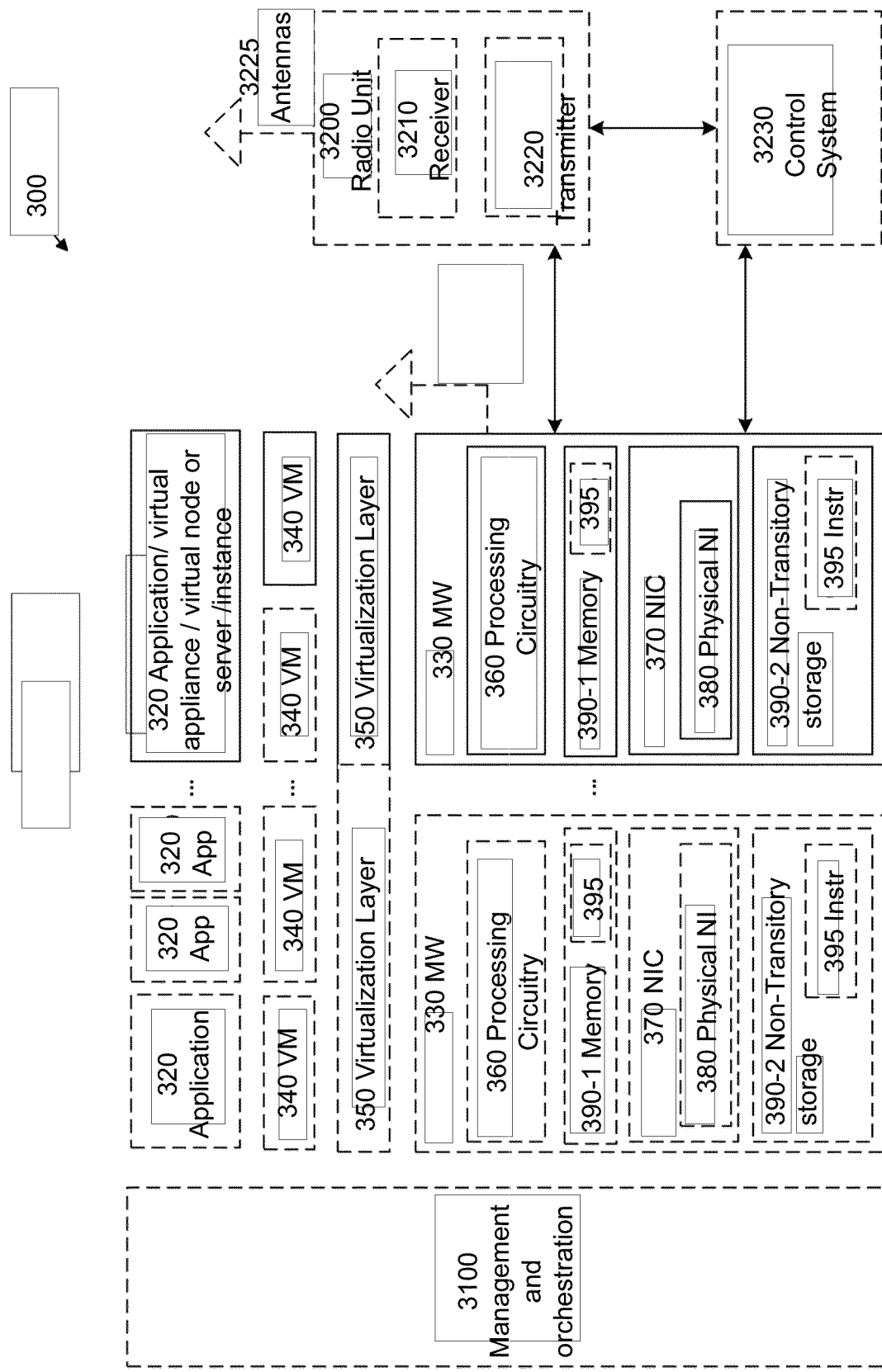
FIG. 15 illustrates a virtualization environment in which functions implemented by some embodiments may be virtualized, according to certain embodiments.

FIG. 15 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 15, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 15.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 16:
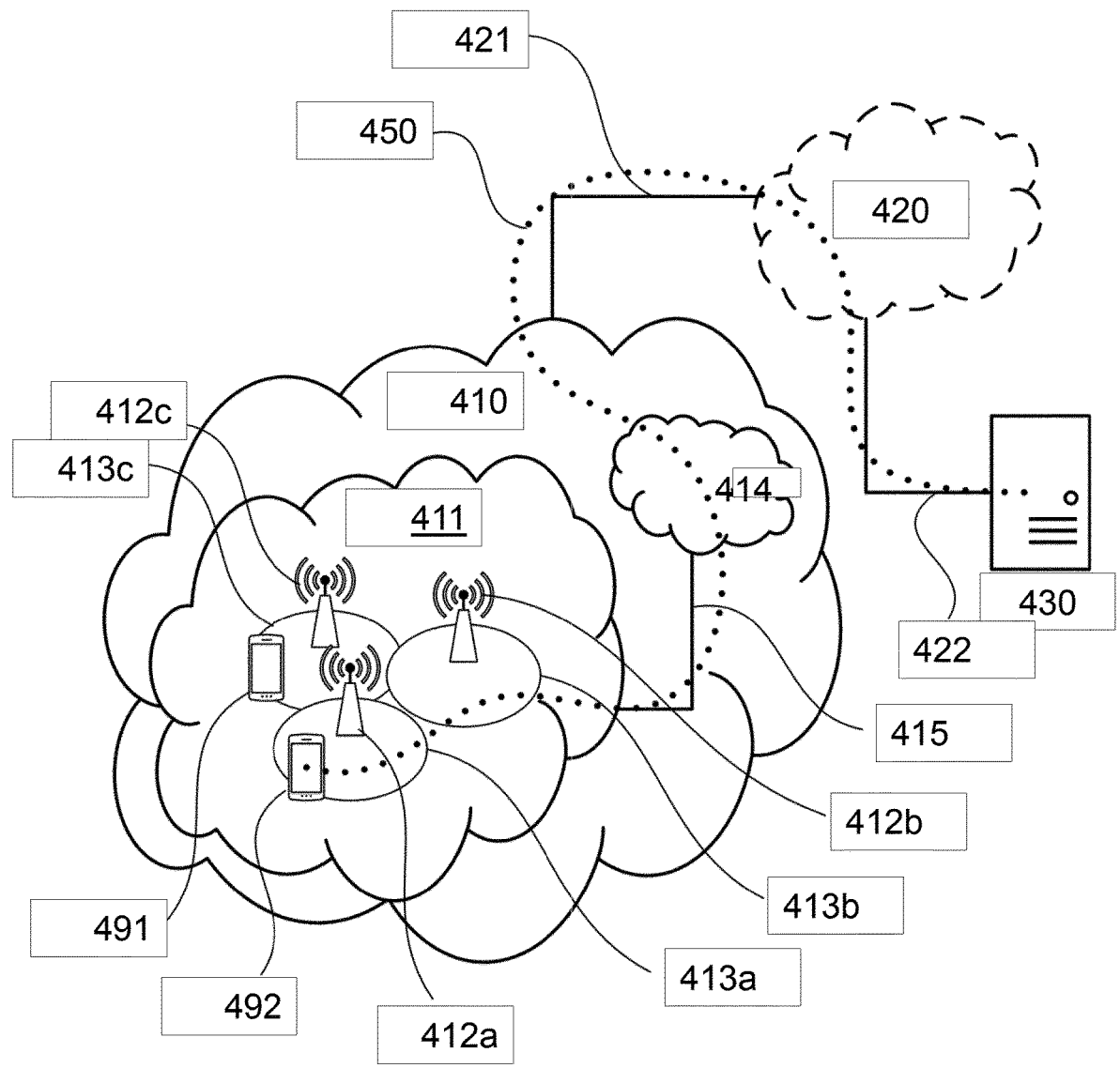
FIG. 16 illustrates a telecommunication network connected via an intermediate network to a host computer, according to certain embodiments.

FIG. 16 illustrates a telecommunication network connected via an intermediate network to a host computer in accordance with some embodiments.

With reference to FIG. 16, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 16 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 17:
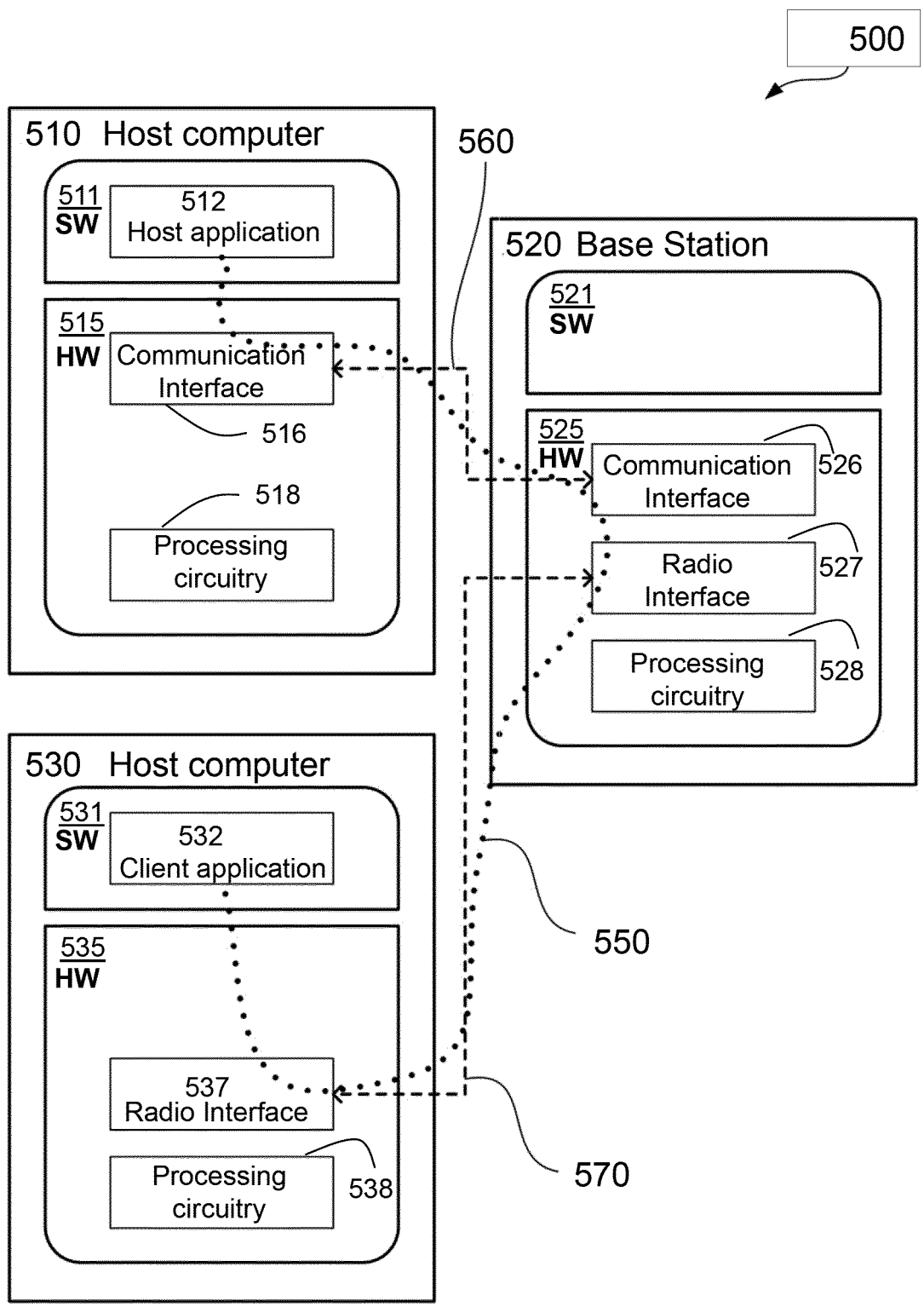
FIG. 17 illustrates a generalized block diagram of a host computer communicating via a base station with a user equipment over a partially wireless connection, according to certain embodiments.

FIG. 17 illustrates a host computer communicating via a base station with a user equipment over a partially wireless connection in accordance with some embodiments. n communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via a OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 17) served by base station 520. Communication interface 526 may be configured to facilitate connection 560 to host computer 510. Connection 560 may be direct or it may pass through a core network (not shown in FIG. 17) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 17 may be similar or identical to host computer 430, one of base stations 412a, 412b, 412c and one of UEs 491, 492 of FIG. 16, respectively. This is to say, the inner workings of these entities may be as shown in FIG. 17 and independently, the surrounding network topology may be that of FIG. 16.

In FIG. 17, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 18, 19:
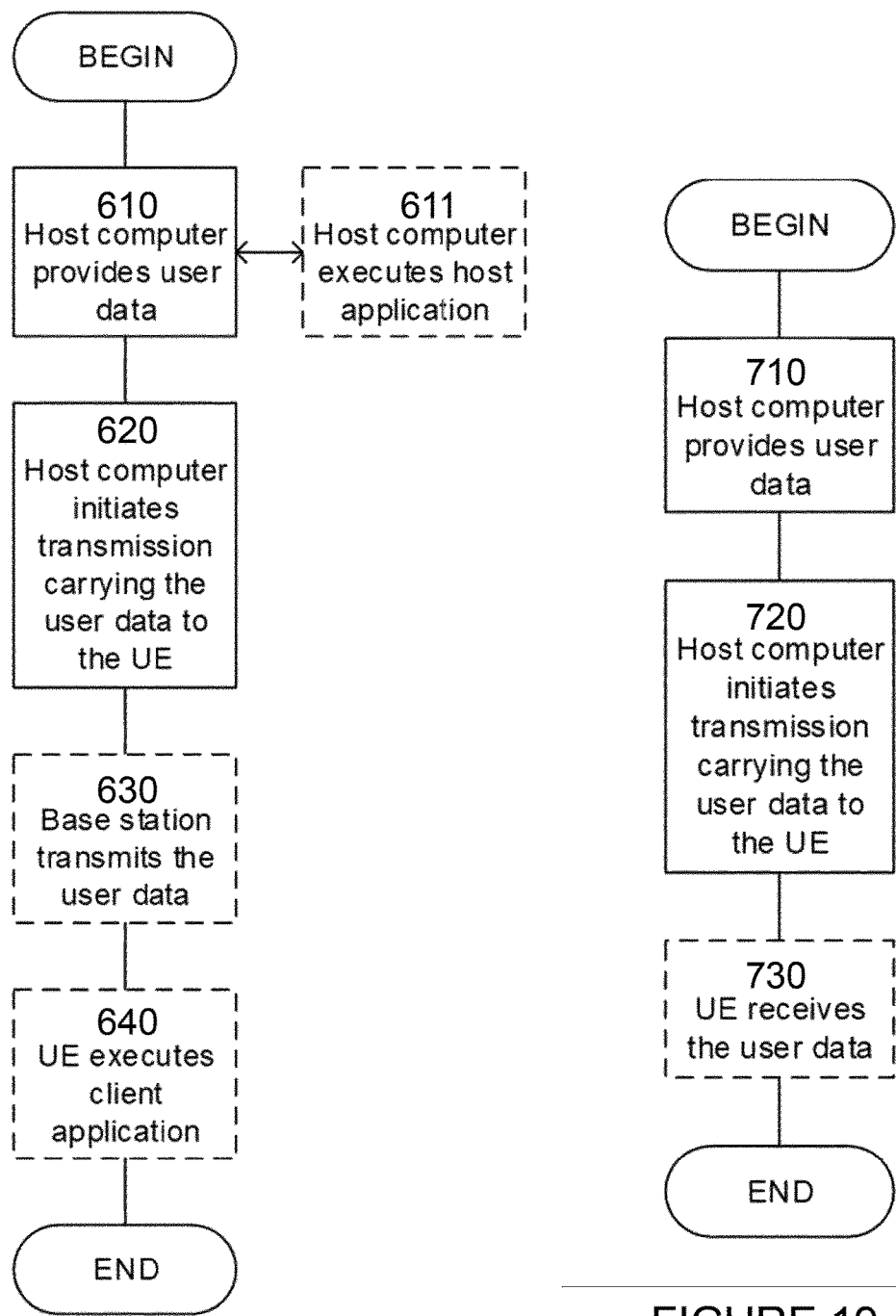
FIG. 18 illustrates a method implemented in a communication system, according to one embodiment.
FIG. 19 illustrates another method implemented in a communication system, according to one embodiment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 20, 21:
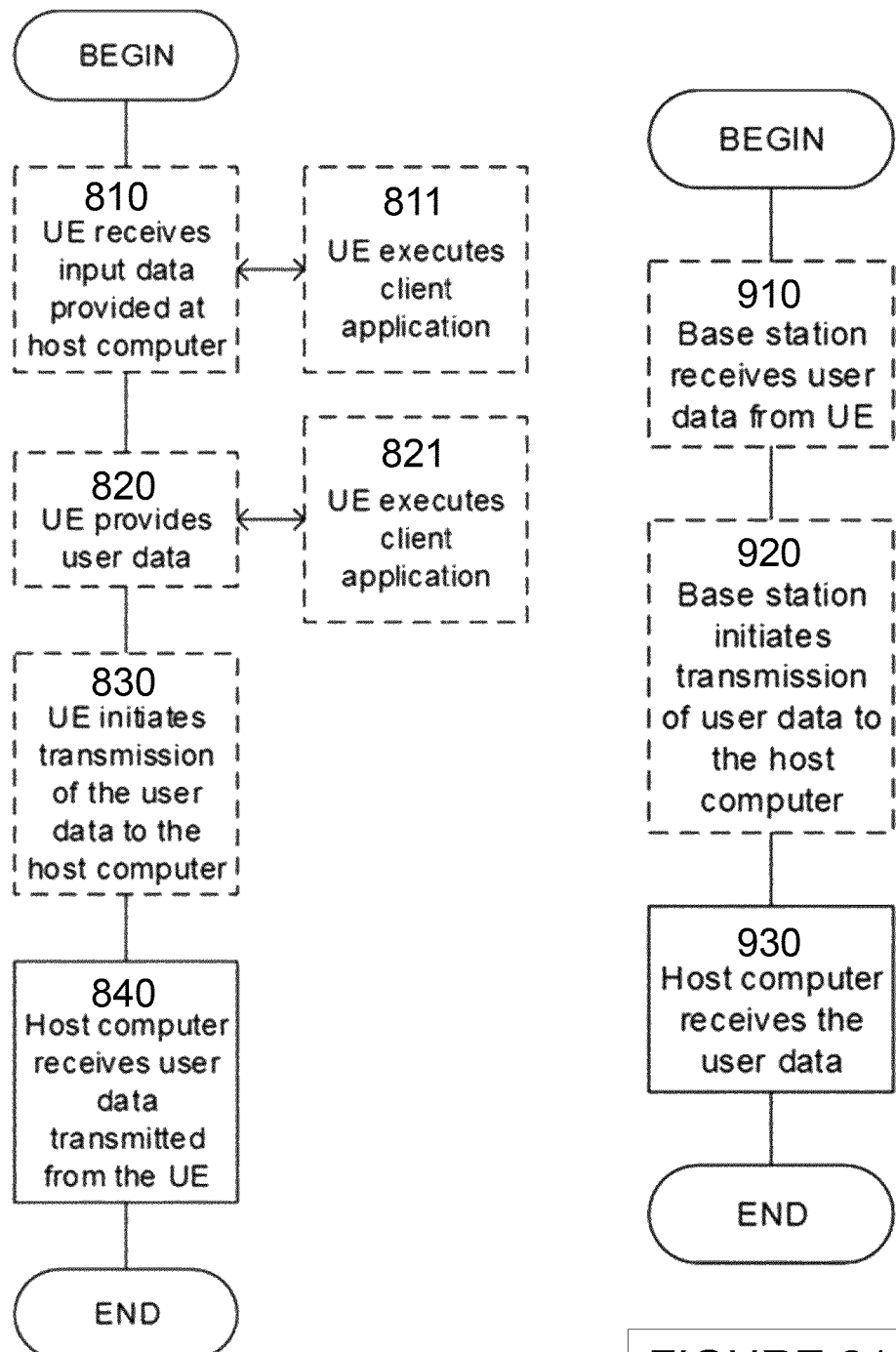
FIG. 20 illustrates another method implemented in a communication system, according to one embodiment.
FIG. 21 illustrates another method implemented in a communication system, according to one embodiment.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 22:
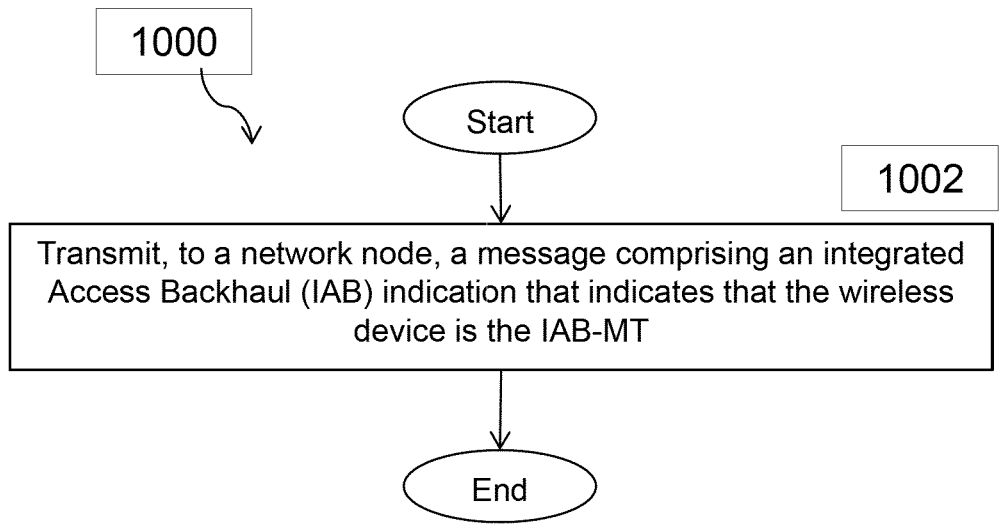
FIG. 22 illustrates an example method by a wireless device operating as an IAB-MT, according to certain embodiments.

FIG. 22 depicts a method 1000 by a wireless device 110 operating as an IAB-MT, according to certain embodiments. At step 1002, the wireless device 110 transmits, to a network node 160, a message comprising an IAB indication that indicates that the wireless device 110 is the TAB-MT.

In a particular embodiment, the wireless device 110 is a child IAB node with respect to the network node.

In a particular embodiment, the message is a RRC message.

In a particular embodiment, for example, the network node 160 is operating as a DU with respect to the wireless device 110, and wherein the message is a RRCSetupRequest message or a RRCSetupComplete message. In a further particular embodiment, the wireless device 110 transmits, to the network node 160, an acknowledgement and receives a RRCSetupComplete or RRCSetupRequest message from the network node 160.

In another particular embodiment, for example, the network node 160 is operating as a Central Unit (CU) and the RRC message is a RRCSetupComplete message or a RRC-SetupRequest message. In a further particular embodiment, based on the message, a new logical path is established from the OAM-system of the donor node to the OAM client of the network node 160.

In a particular embodiment, based on the message, a connection is established through a Distributed Unit (DU) of the network node to the wireless device 110.

In a particular embodiment, time frequency resources associated with SRB0 or SRB1 are used for the connection. In a further particular embodiment, physical resources are allocated for the connection, wherein the physical resources comprises a LCID-value reserved only for the OAM.

In a particular embodiment, the wireless device 110 receives data comprising U-SIM or EAP-TLS information for use when the wireless device 110 receives an authorization request and transmits an acknowledgement to the network node 160, the acknowledgement acknowledging reception of the data. In a further particular embodiment, in response to transmitting the acknowledgment to the network node 160, the wireless device 110 receives a RRCSetupComplete message or RRCSetUpRequest from the network node 160.

In a particular embodiment, the wireless device 110 receives data comprising U-SIM or EAP-TLS information for use when the wireless device 110 receives an authorization request.

In a particular embodiment, the IAB indication comprises barring information in SIB1 or wherein the IAB indicates that IAB-MT will only use IAB-RACH.

Figure 23:
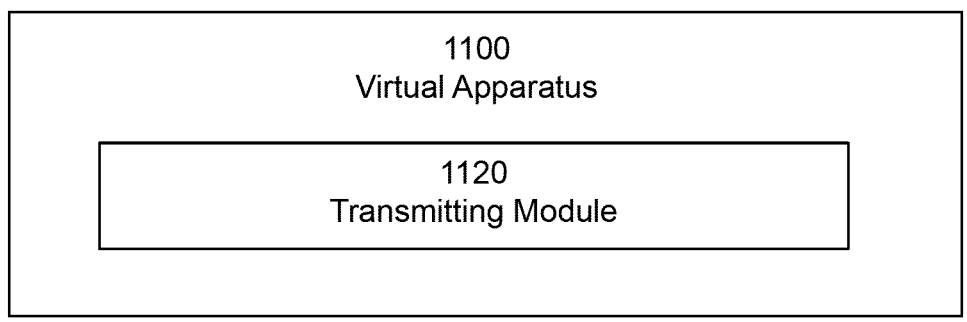
FIG. 23 illustrates an exemplary virtual computing device, according to certain embodiments.

FIG. 23 illustrates a schematic block diagram of a virtual apparatus 1100 in a wireless network (for example, the wireless network shown in FIG. 11). The apparatus may be implemented in a wireless device or network node (e.g., wireless device 110 or network node 160 shown in FIG. 11). Apparatus 1100 is operable to carry out the example method described with reference to FIG. 22 and possibly any other processes or methods disclosed herein. It is also to be understood that the method of FIG. 22 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1110 and any other suitable units of apparatus 1100 to perform corresponding functions according one or more embodiments of the present disclosure.

According to certain embodiments, transmitting module 1110 may perform certain of the transmitting functions of the apparatus 1100. For example, transmitting module 1110 may transmit, to a network node, a message comprising an IAB indication that indicates that the wireless device is the IAB-MT.

As used herein, the term module may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

Figure 24:
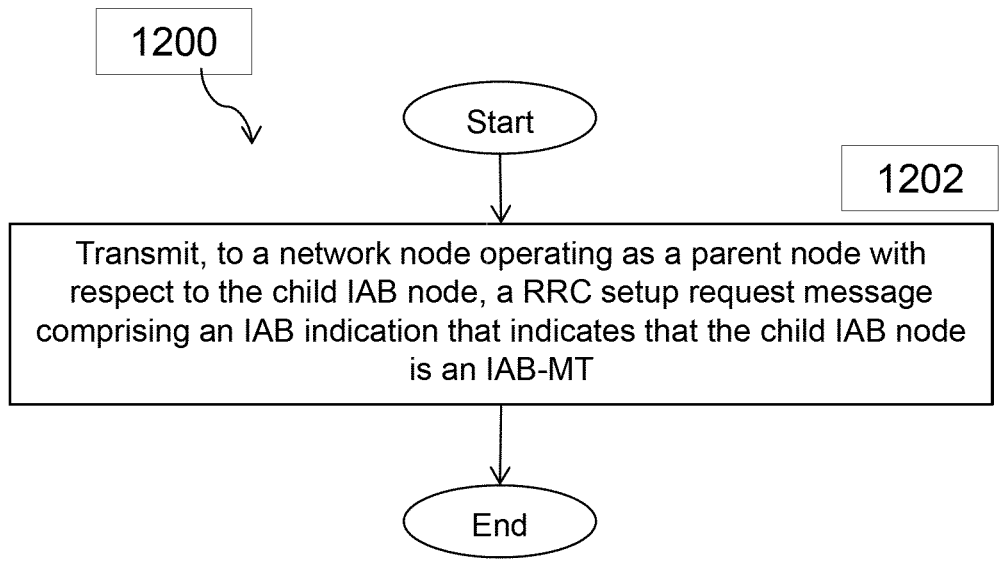
FIG. 24 illustrates an example method by a by a child IAB node comprising an IAB-MT, according to certain embodiments.

FIG. 24 depicts a method 1200 by a child IAB node 12 comprising an IAB-MT 26, according to certain embodiments. At step 1202, the child IAB node 12 transmits, to a network node 160 operating as a parent node 14 with respect to the child IAB node 12, a RRC setup request message comprising an IAB indication that indicates that the transmission to the network node 160 is by the child IAB node 12 comprising the IAB-MT 26.

In a particular embodiment, the network node 160 is operating as a DU 28 with respect to the child IAB node 12.

In a particular embodiment, the child IAB node 12 transmits, to the network node 160, an acknowledgement comprising a RRCSetupComplete.

In a particular embodiment, the network node 160 is operating as a CU 36.

In a particular embodiment, based on the message, a OAM connection is established from an OAM system associated with a donor node 16 to the OAM client 24 of the child IAB node 12. Herein, the terms OAM connection, OAM backhaul channel, and logical path for a OAM backhaul channel may be used interchangeably.

In a particular embodiment, based on the message, a OAM connection is established through a DU 28 of the network node 160 operating as a parent node 14 to the IAB child node 12.

In a particular embodiment, the child IAB node 12 receives data comprising U-SIM or EAP-TLS information for use when the child IAB node 12 receives an authorization request.

In a particular embodiment, the child IAB node 12 transmits an acknowledgement to the network node 160 operating as the parent node 14. The acknowledgement acknowledges reception of the data comprising the U-SIM or EAP-TLS.

Figure 25:
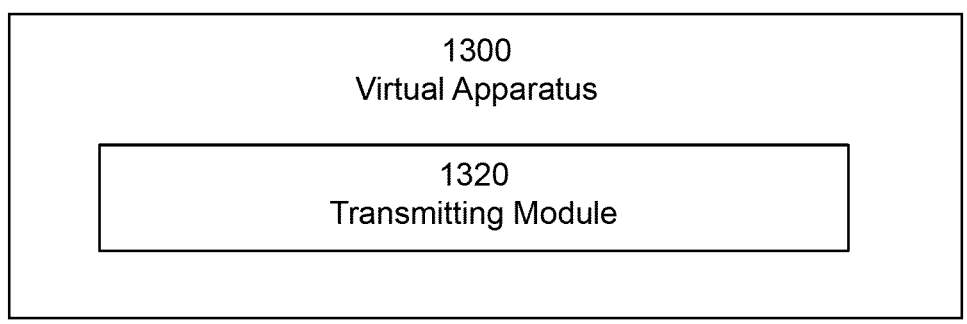
FIG. 25 illustrates another exemplary virtual computing device, according to certain embodiments.

FIG. 25 illustrates a schematic block diagram of a virtual apparatus 1300 in a wireless network (for example, the wireless network shown in FIG. 11). The apparatus may be implemented in a wireless device or network node (e.g., wireless device 110 or network node 160 shown in FIG. 11). Apparatus 1300 is operable to carry out the example method described with reference to FIG. 24 and possibly any other processes or methods disclosed herein. It is also to be understood that the method of FIG. 24 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1310 and any other suitable units of apparatus 1300 to perform corresponding functions according one or more embodiments of the present disclosure.

According to certain embodiments, transmitting module 1310 may perform certain of the transmitting functions of the apparatus 1300. For example, transmitting module 1310 may transmit, to a network node 160 operating as a parent node 14 with respect to a child IAB node 12, a RRC setup request message comprising an IAB indication that indicates that the transmission to the network node 160 is by the child IAB node 12 comprising the IAB-MT 26.

Figure 26:
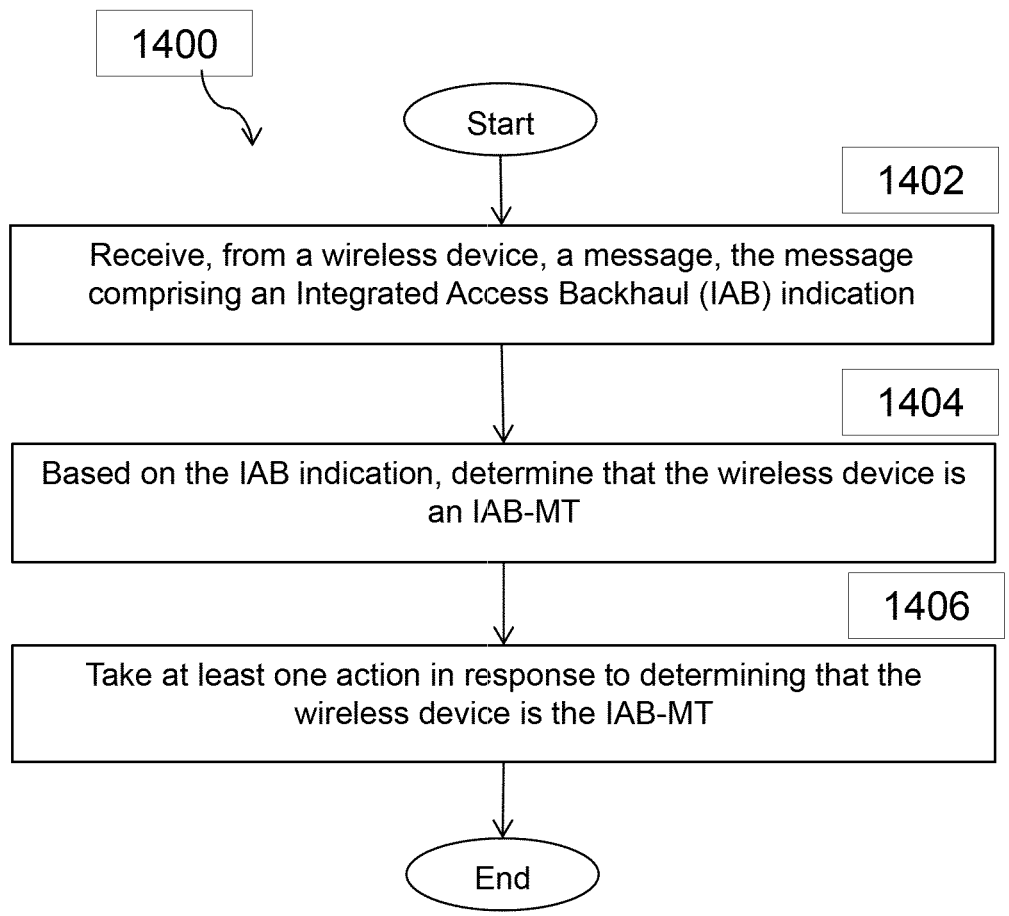
FIG. 26 illustrates an example method by a network node, according to certain embodiments.

FIG. 26 depicts a method 1400 by a network node 160, according to certain embodiments. At step 1402, the network node 160 receives, from a wireless device 110, a message. The message comprising an Integrated Access Backhaul (IAB) indication. Based on the IAB indication, the network node 160 determines that the wireless device 110 is an IAB-Mobile Termination (IAB-MT), at step 1404. At step 1406, the network node 160 takes at least one action in response to determining that the wireless device 110 is the IAB-MT.

In a particular embodiment, the wireless device 110 is a child IAB node with respect to the network node.

In a particular embodiment, the message is a RRC message.

In a particular embodiment, for example, the network node 160 is operating as a DU, and the message is a RRCSetupRequest message or a RRCSetupComplete message. In a further particular embodiment, taking the at least one action comprises at least one of: initiating a setup of an Operations and Maintenance (OAM) backhaul-channel with the wireless device without sending the message to the Central Unit (CU); and in response to receiving an acknowledgement from the wireless device, transmitting a RRCSetupComplete or RRCSetupRequest message. In a further particular embodiment, the network node operating as a DU determines not to send the message to the CU.

In a further particular embodiment, initiating the setup of the OAM backhaul-channel with the wireless device 110 includes establishing a new logical path from the OAM-system of the donor node to the OAM client of the network node.

In a further particular embodiment, initiating the setup of the OAM backhaul-channel with the wireless device 110 includes establishing a connection through the DU of the network node 160 to the wireless device 110.

In a particular embodiment, the network node 160 sends data comprising U-SIM or EAP-TLS information to the wireless device 110 for use when the wireless device 110 receives an authorization request and the network node receives an acknowledgement from the wireless device 110 acknowledging reception of the data.

In a further particular embodiment, the network node 160 uses time frequency resources associated with SRB0 or SRB1 for the connection.

In a further particular embodiment, the network node 160 allocates physical resources for the connection to the wireless device, and the physical resources comprise a LCID-value reserved only for the OAM.

In another particular embodiment, the network node 160 is operating as a CU, and the RRC message is a RRCSetupComplete message or a RRCSetupRequest message. In a further particular embodiment, taking the at least one action comprises determining not to send the message to the AMF. In a further particular embodiment, in response to receiving a message from a OAM system indicating to establish an OAM connection with the wireless device 110, the network node 160 sets up a connection through a parent DU to the wireless device 110.

In a particular embodiment, in response to obtaining a certificate for the IAB-MT from the OAM system, the network node 160 sends the certificate to the network node via a RRC message.

In a particular embodiment, the network node 160 sends data comprising U-SIM or EAP-TLS information to the wireless device 110 for use when the wireless device 110 receives an authorization request. In response to receiving an acknowledgment from the wireless device 110, the network node 160 transmits a registration request to the core network and/or transmitting a RRCSetup message to the wireless device 110.

In a particular embodiment, the network node 160 uses time frequency resources associated with SRB0 or SRB1 for the connection.

In a particular embodiment, the IAB indication comprises barring information in SIB1 or wherein the IAB indicates that IAB-MT will only use IAB-RACH.

In a particular embodiment, taking the at least one action comprises at least one of: initiating a setup of an Operations and Maintenance (OAM) backhaul-channel with the wireless device 110 without sending the message to a Central Unit (CU); and sending data comprising U-SIM or EAP-TLS information to the wireless device 110 for use when the wireless device 110 receives an authorization request.

In a further particular embodiment, initiating the setup of the OAM backhaul-channel with the wireless device 110 comprises establishing a new logical path from the OAM-system of the donor node to the OAM client of the network node 160.

In a further particular embodiment, initiating the setup of the OAM back-haul channel with the wireless device 110 comprises establishing a connection through a Distributed Unit (DU) of the network node to the wireless device 110.

In a further particular embodiment, the network node 160 uses time frequency resources associated with SRB0 or SRB1 for the OAM back-haul channel.

In a further particular embodiment, in response to receiving an acknowledgment from the wireless device 110, the network node 160 transmits a RRCSetupComplete message or RRCSetUpRequest to the wireless device 110.

Figure 27:
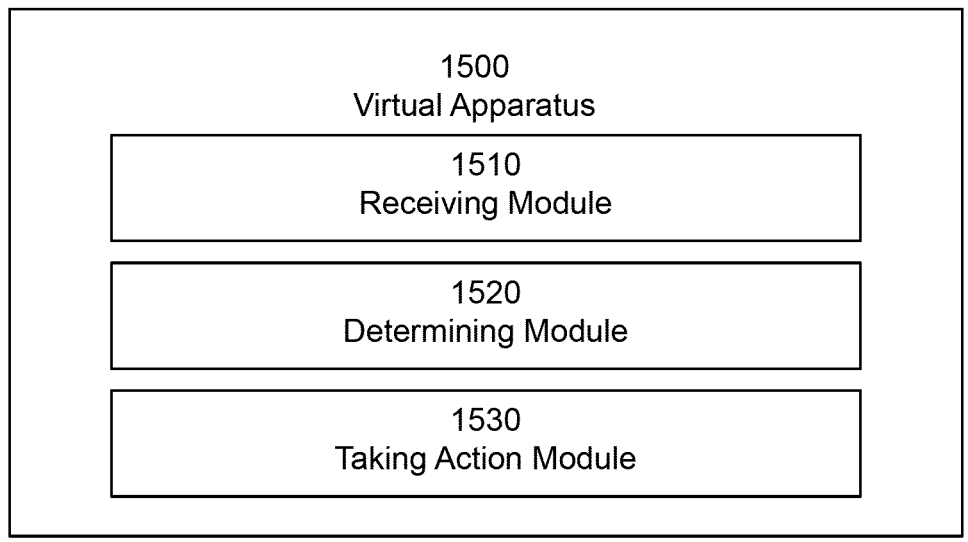
FIG. 27 illustrates another exemplary virtual computing device, according to certain embodiments.

FIG. 27 illustrates a schematic block diagram of a virtual apparatus 1500 in a wireless network (for example, the wireless network shown in FIG. 11). The apparatus may be implemented in a wireless device or network node (e.g., wireless device 110 or network node 160 shown in FIG. 11). Apparatus 1500 is operable to carry out the example method described with reference to FIG. 26 and possibly any other processes or methods disclosed herein. It is also to be understood that the method of FIG. 26 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510, determining module 1520, taking action module 1530, and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, from a wireless device, a message. The message comprises IAB indication.

According to certain embodiments, determining module 1520 may perform certain of the determining functions of the apparatus 1500. For example, based on the IAB indication, determining module 1520 may determine that the wireless device is an IAB-MT.

According to certain embodiments, taking action module 1530 may perform certain of the taking action functions of the apparatus 1500. For example, taking action module 1530 may take at least one action in response to determining that the wireless device is the IAB-MT.

Figure 28:
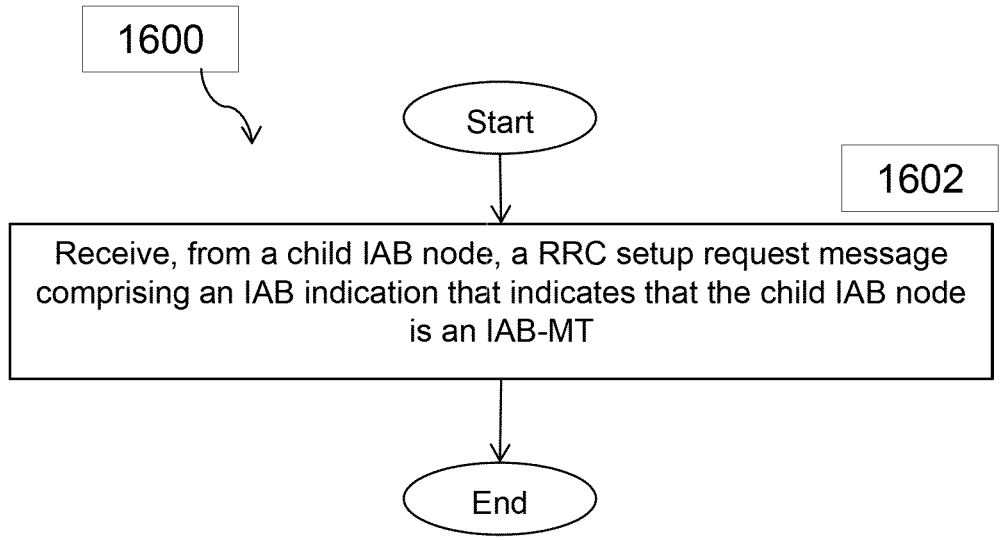
FIG. 28 illustrates an example method by a network node operating as a parent node with respect to a child IAB node, according to certain embodiments.

FIG. 28 illustrates an example method 1600 by a network node 160 operating as a parent node 14 with respect to a child IAB node 12, according to certain embodiments. At step 1602, the network node 160 receives, from the child IAB node 12, a RRC setup request message comprising an IAB indication that indicates that the transmission to the network node 160 is by the child IAB node 12 comprising a IAB-MT 26.

In a particular embodiment, the network node 160 is operating as a DU 28 with respect to the child IAB node 12.

In a particular embodiment, the network node 160 initiates a setup of an OAM connection with the child IAB node 12 and, in response to receiving an acknowledgement from the child IAB node 12, transmits a RRCSetupComplete message.

In a particular embodiment, the network node 160 determines not to send the message to a CU.

In a particular embodiment, initiating the setup of the OAM connection with the child IAB node 12 includes establishing an OAM connection from a OAM-system of a donor node 16 to an OAM client 30 of the network node 160 operating as the parent node 14.

In a particular embodiment, initiating the setup of the OAM connection with the child IAB node 12 comprises establishing an OAM connection through the DU 28 of the network node 160 operating as the parent node 14 to the child IAB node 12.

In a particular embodiment, the network node is operating as a CU 36 with respect to the child IAB node 12.

In a particular embodiment, the parent node 160 operating as the parent node 14 determines to delay sending the RRC setup request message to an AMF until after an OAM connection is setup.

In a particular embodiment, in response to receiving a message from an OAM system indicating to establish the OAM connection with the child IAB node, the network node 160 operating as the parent node 14 sets up the OAM connection through a parent DU 28 to the child IAB node 12.

In a particular embodiment, in response to obtaining a certificate for the IAB-MT from the OAM system, the network node 160 sends the certificate to the network node via a RRC message. For example, after the RRCSetupComplete is received, it is possible for the CU 36 or connecting child IAB node 12 (i.e., UE) to send a "UL/DL InformationTransfer" message. This is typically used for sending dedicated NAS messages. However, when the CU 36 detects the IAB node indication from the RRCSetupComplete message, the CU 36 may send the needed OAM data as a dedicated NAS message to the child IAB node 12. Thus, in this scenario, the CU 36 holds back the sending of the Initial registration request towards the 5GC 18 until the necessary security certifications have been received by the connecting child IAB node 12.

In a particular embodiment, the network node sends data comprising U-SIM or EAP-TLS information to the child IAB node 12 for use when the child IAB node 12 receives an authorization request.

In a particular embodiment, in response to receiving an acknowledgment from the child IAB node 12, the network node 160 operating as the parent node 14 transmits a registration request to a core network 18.

Figure 29:
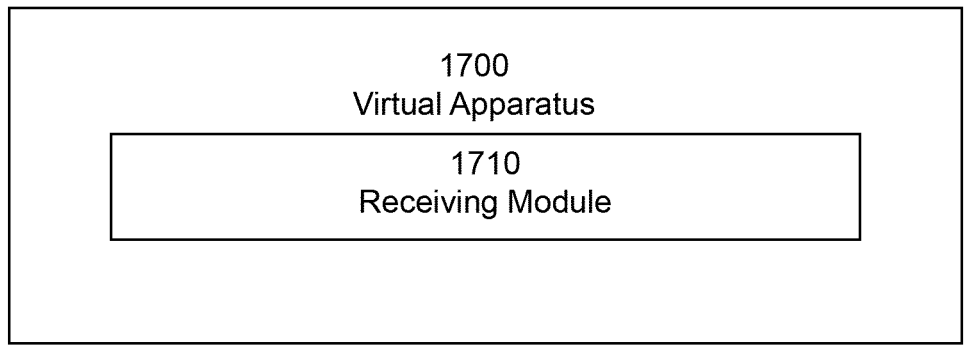
FIG. 29 illustrates another exemplary virtual computing device, according to certain embodiments.

FIG. 29 illustrates a schematic block diagram of a virtual apparatus 1700 in a wireless network (for example, the wireless network shown in FIG. 11). The apparatus may be implemented in a wireless device or network node (e.g., wireless device 110 or network node 160 shown in FIG. 11). Apparatus 1700 is operable to carry out the example method described with reference to FIG. 28 and possibly any other processes or methods disclosed herein. It is also to be understood that the method of FIG. 28 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1710 and any other suitable units of apparatus 1700 to perform corresponding functions according one or more embodiments of the present disclosure.

According to certain embodiments, receiving module 1710 may perform certain of the receiving functions of the apparatus 1700. For example, receiving module 1710 may receive, from the child IAB node 12, a RRC setup request message comprising an IAB indication that indicates that the transmission to the network node 160 is by the child IAB node 12 comprising a IAB-MT 26.

Figure 30:
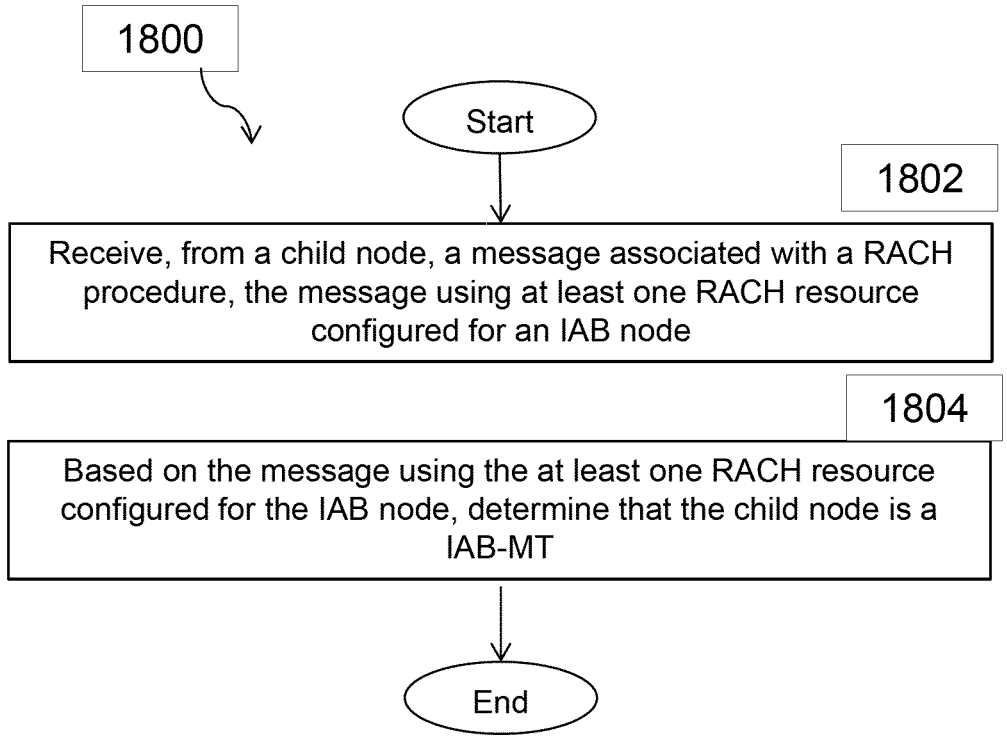
FIG. 30 illustrates an example method by a network node operating as a parent node with respect to a child node, according to certain embodiments.

FIG. 30 illustrates an example method 1800 by a network node 160 operating as a parent node 14 with respect to a child IAB node 12, according to certain embodiments. At step 1802, the network node 160 receives, from the child IAB node 12, a message associated with a RACH procedure. The message uses at least one RACH resource configured for an IAB node. Based on the message using the at least one RACH resource configured for the IAB node, the network node 160 operating as the parent node 14 determines that the message to the network node is by the child IAB node 12 comprising a IAB-MT 26.

In a particular embodiment, the network node 160 operating as the parent node 14 comprises a DU 28.

In a particular embodiment, the network node 16 operating as the parent node 14 initiates a setup of an OAM connection with the child IAB node 12 without sending a RRC set up request message to the CU 36.

In a particular embodiment, when initiating the setup of the OAM connection, the network node 160 operating as the parent node 14 establishes the OAM connection from an OAM system of a donor node 16 to an OAM client 30 of the network node operating as the parent with respect to the child IAB node 12.

In a particular embodiment, the network node 160 uses the OAM client of the network node to set up the OAM connection with the child AIB node 12 through a DU 28 of the network node.

Figure 31:
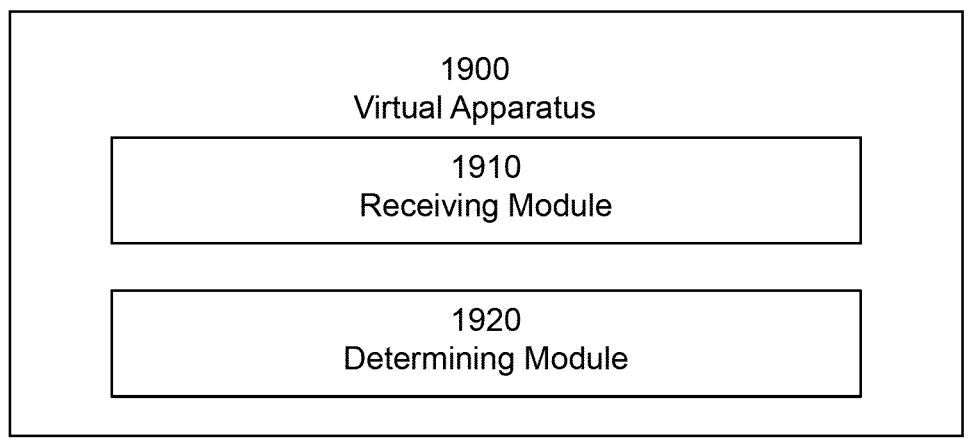
FIG. 31 illustrates another exemplary virtual computing device, according to certain embodiments.

FIG. 31 illustrates a schematic block diagram of a virtual apparatus 1900 in a wireless network (for example, the wireless network shown in FIG. 11). The apparatus may be implemented in a wireless device or network node (e.g., wireless device 110 or network node 160 shown in FIG. 11). Apparatus 1900 is operable to carry out the example method described with reference to FIG. 30 and possibly any other processes or methods disclosed herein. It is also to be understood that the method of FIG. 30 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1910, determining module 1920, and any other suitable units of apparatus 1900 to perform corresponding functions according one or more embodiments of the present disclosure.

According to certain embodiments, receiving module 1910 may perform certain of the receiving functions of the apparatus 1900. For example, receiving module 1910 may receive, from the child IAB node 12, a message associated with a RACH procedure. The message uses at least one RACH resource configured for an IAB node.

According to certain embodiments, determining module 1920 may perform certain of the determining functions of the apparatus 1900. For example, based on the message using the at least one RACH resource configured for the IAB node, determining module 1920 may determine that the message to the network node is by the child IAB node 12 comprising a IAB-MT 26.

Example Embodiments

Group A Embodiments

Example Embodiment 1. A method performed by a wireless device operating as an IAB-Mobile Termination (IAB-MT), the method comprising: transmitting, to a network node, a message comprising an Integrated Access Backhaul (IAB) indication that indicates that the wireless device is the IAB-MT.

Example Embodiment 2. The method of Example Embodiment 1, wherein the wireless device is a child IAB node with respect to the network node.

Example Embodiment 3. The method of any one of Example Embodiments 1 to 2, wherein the message is a Radio Resource Control (RRC) message.

Example Embodiment 4. The method of any one of Example Embodiments 1 to 3, wherein the network node is operating as a Distributed Node with respect to the wireless device, and wherein the message is a RRCSetupRequest message or a RRCSetupComplete message.

Example Embodiment 5. The method of Example Embodiment 4, further comprising: transmitting, to the network node, an acknowledgement; and receiving a RRCSetupComplete or RRCSetupRequest message from the network node.

Example Embodiment 6. The method of any one of Example Embodiments 1 to 3, wherein the network node is operating as a Central Unit (CU) and the RRC message is a RRCSetupComplete message or a RRCSetupRequest message.

Example Embodiment 7. The method of any one of Example Embodiments 1 to 6, wherein, based on the message, a new logical path is established from the OAM-system of the donor node to the OAM client of the network node.

Example Embodiment 8. The method of any one of Example Embodiments 1 to 6, wherein, based on the message, a connection is established through a Distributed Unit (DU) of the network node to the wireless device.

Example Embodiment 9. The method of Example Embodiment 8, wherein time frequency resources associated with SRB0 or SRB1 are used for the connection.

Example Embodiment 10. The method of Example Embodiment 8, wherein physical resources are allocated for the connection, wherein the physical resources comprises a LCID-value reserved only for the OAM.

Example Embodiment 11. The method of any one of Example Embodiments 1 to 10, further comprising: receiving data comprising U-SIM or EAP-TLS information for use when the wireless device receives an authorization request; and transmitting an acknowledgement to the network node, the acknowledgement acknowledging reception of the data.

Example Embodiment 12. The method of Example Embodiment 11, further comprising: in response to transmitting the acknowledgment to the network node, receiving a RRCSetupComplete message or RRCSetUpRequest from the network node.

Example Embodiment 13. The method of any one of Example Embodiments 1 to 12, further comprising receiving data comprising U-SIM or EAP-TLS information for use when the wireless device receives an authorization request.

Example Embodiment 14. The method of any one of Example Embodiments 1 to 13, wherein the IAB indication comprises barring information in SIB1 or wherein the IAB indicates that IAB-MT will only use IAB-RACH.

Example Embodiment 15. A computer program comprising instructions which when executed on a computer perform any of the methods of Example Embodiments 1 to 14.

Example Embodiment 16. A computer program product comprising computer program, the computer program comprising instructions which when executed on a computer perform any of the methods of Example Embodiments 1 to 14.

Example Embodiment 17. A non-transitory computer readable medium storing instructions which when executed by a computer perform any of the methods of Example Embodiments 1 to 14.

Group B1 Embodiments

Example Embodiment 18. A method performed by a network node, the method comprising: receiving, from a wireless device, a message, the message comprising an Integrated Access Backhaul (IAB) indication; and based on the IAB indication, determining that the wireless device is an IAB-Mobile Termination (IAB-MT); and taking at least one action in response to determining that the wireless device is the IAB-MT.

Example Embodiment 19. The method of Example Embodiment 18, wherein the wireless device is a child IAB node with respect to the network node.

Example Embodiment 20. The method of any one of Example Embodiments 18 to 19, wherein the message is a Radio Resource Control (RRC) message.

Example Embodiment 21. The method of any one of Example Embodiments 18 to 20, wherein the network node is operating as a Distributed Unit (DU), and wherein the message is a RRCSetupRequest message or a RRCSetupComplete message.

Example Embodiment 22. The method of Example Embodiment 21, wherein taking the at least one action comprises at least one of: initiating a setup of an Operations and Maintenance (OAM) backhaul-channel with the wireless device without sending the message to the Central Unit (CU); in response to receiving an acknowledgement from the wireless device, transmitting a RRCSetupComplete or RRCSetupRequest message.

Example Embodiment 23. The method of Example Embodiment 22, further comprising determining not to send the message to the CU.

Example Embodiment 24. The method of any one of Example Embodiments 22 to 23, wherein initiating the setup of the OAM backhaul-channel with the wireless device comprises establishing a new logical path from the OAM-system of the donor node to the OAM client of the network node.

Example Embodiment 25. The method of any one of Example Embodiments 22 to 23, wherein initiating the setup of the OAM backhaul-channel with the wireless device comprises establishing a connection through the DU of the network node to the wireless device.

Example Embodiment 26. The method of any one of Example Embodiments 18 to 25, further comprising: sending data comprising U-SIM or EAP-TLS information to the wireless device for use when the wireless device receives an authorization request; and receiving an acknowledgement from the wireless device acknowledging reception of the data.

Example Embodiment 27. The method any one of Example Embodiments 25 to 26, further comprising using time frequency resources associated with SRB0 or SRB1 for the connection.

Example Embodiment 28. The method of any one of Example Embodiments 25 to 26, further comprising allocating physical resources for the connection to the wireless device, wherein the physical resources comprises a LCID-value reserved only for the OAM.

Example Embodiment 29. The method of any one of Example Embodiments 18 to 20, wherein the network node is operating as a Central Unit (CU) and the RRC message is a RRCSetupComplete message or a RRCSetupRequest message.

Example Embodiment 30. The method of Example Embodiment 29, wherein taking the at least one action comprises determining not to send the message to the AMF.

Example Embodiment 31. The method of any one of Example Embodiments 29 to 30, further comprising in response to receiving a message from a OAM system indicating to establish an OAM connection with the wireless device, setting up a connection through a parent DU to the wireless device.

Example Embodiment 32. The method of any one of Example Embodiments 29 to 31, further comprising in response to obtaining a certificate for the IAB-MT from the OAM system, sending the certificate to the network node via a RRC message.

Example Embodiment 33. The method of any one of Example Embodiments 29 to 32, further comprising: sending data comprising U-SIM or EAP-TLS information to the wireless device for use when the wireless device receives an authorization request; and in response to receiving an acknowledgment from the wireless device, transmitting a registration request to the core network and/or transmitting a RRCSetup message to the wireless device.

Example Embodiment 34. The method any one of Example Embodiments 31 to 33, further comprising using time frequency resources associated with SRB0 or SRB1 for the connection.

Example Embodiment 35. The method of any one of Example Embodiments 31 to 34, wherein the IAB indication comprises barring information in SIB1 or wherein the IAB indicates that IAB-MT will only use IAB-RACH.

Example Embodiment 36. The method of any one of Example Embodiments 18 to 20, wherein taking the at least one action comprises at least one of: initiating a setup of an Operations and Maintenance (OAM) backhaul-channel with the wireless device without sending the message to a Central Unit (CU); and sending data comprising U-SIM or EAP-TLS information to the wireless device for use when the wireless device receives an authorization request.

Example Embodiment 37. The method of Example Embodiment 36, wherein initiating the setup of the OAM backhaul-channel with the wireless device comprises establishing a new logical path from the OAM-system of the donor node to the OAM client of the network node.

Example Embodiment 38. The method of Example Embodiment 36, wherein initiating the setup of the OAM back-haul channel with the wireless device comprises establishing a connection through a Distributed Unit (DU) of the network node to the wireless device.

Example Embodiment 39. The method any one of Example Embodiments 36 to 38, further comprising using time frequency resources associated with SRB0 or SRB1 for the OAM back-haul channel.

Example Embodiment 40. The method of any one of Example Embodiments 36 to 39, further comprising: in response to receiving an acknowledgment from the wireless device, transmitting a RRCSetupComplete message or RRCSetUpRequest to the wireless device.

Example Embodiment 41. A computer program comprising instructions which when executed on a computer perform any of the methods of Example Embodiments 18 to 40.

Example Embodiment 42. A computer program product comprising computer program, the computer program comprising instructions which when executed on a computer perform any of the methods of Example Embodiments 18 to 40.

Example Embodiment 43. A non-transitory computer readable medium storing instructions which when executed by a computer perform any of the methods of Example Embodiments 18 to 40.

Group C Embodiments

Example Embodiment 44. A wireless device comprising: processing circuitry configured to perform any of the steps of any of the Group A embodiments; and power supply circuitry configured to supply power to the wireless device.

Example Embodiment 45. A network node comprising: processing circuitry configured to perform any of the steps of any of the Group B embodiments; power supply circuitry configured to supply power to the wireless device.

Example Embodiment 46. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 47. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the Group B embodiments.

Example Embodiment 48. The communication system of the pervious embodiment further including the network node.

Example Embodiment 49. The communication system of the previous 2 embodiments, further including the wireless device, wherein the wireless device is configured to communicate with the network node.

Example Embodiment 50. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 51. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the Group B embodiments.

Example Embodiment 52. The method of the previous embodiment, further comprising, at the network node, transmitting the user data.

Example Embodiment 53. The method of the previous 2 embodiments, wherein the user data is provided at the host computer by executing a host application, the method further comprising, at the wireless device, executing a client application associated with the host application.

Example Embodiment 54. A wireless device configured to communicate with a network node, the wireless device comprising a radio interface and processing circuitry configured to performs the of the previous 3 embodiments.

Example Embodiment 55. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of the Group A embodiments.

Example Embodiment 56. The communication system of the previous embodiment, wherein the cellular network further includes a network node configured to communicate with the wireless device.

Example Embodiment 57. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 58. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of the Group A embodiments.

Example Embodiment 59. The method of the previous embodiment, further comprising at the wireless device, receiving the user data from the network node.

Example Embodiment 60. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of the Group A embodiments.

Example Embodiment 61. The communication system of the previous embodiment, further including the wireless device.

Example Embodiment 62. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 63. The communication system of the previous 3 embodiments, wherein: the processing circuitry of the host computer is configured to execute a host application; and the wireless device's processing circuitry is configured to execute a client application associated with the host application, thereby providing the user data.

Example Embodiment 64. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 65. A method implemented in a communication system including a host computer, a network node and a wireless device, the method comprising: at the host computer, receiving user data transmitted to the network node from the wireless device, wherein the wireless device performs any of the steps of any of the Group A embodiments.

Example Embodiment 66. The method of the previous embodiment, further comprising, at the wireless device, providing the user data to the network node.

Example Embodiment 67. The method of the previous 2 embodiments, further comprising: at the wireless device, executing a client application, thereby providing the user data to be transmitted; and at the host computer, executing a host application associated with the client application.

Example Embodiment 68. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 69. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group B embodiments.

Example Embodiment 70. The communication system of the previous embodiment further including the network node.

Example Embodiment 71. The communication system of the previous 2 embodiments, further including the wireless device, wherein the wireless device is configured to communicate with the network node.

Example Embodiment 72. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 73. A method implemented in a communication system including a host computer, a network node and a wireless device, the method comprising: at the host computer, receiving, from the base station, user data originating from a transmission which the network node has received from the wireless device, wherein the wireless device performs any of the steps of any of the Group A embodiments.

Example Embodiment 74. The method of the previous embodiment, further comprising at the network node receiving the user data from the wireless device.

Example Embodiment 75. The method of the previous 2 embodiments, further comprising at the network node, initiating a transmission of the received user data to the host computer.

Example Embodiment 76. The method of any of the previous embodiments, wherein the network node comprises a base station.

Example Embodiment 77. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a child Integrated Access Backhaul (IAB) node comprising an IAB-Mobile Termination (IAB-MT), the method comprising:
   transmitting, to a network node operating as a parent node with respect to the child IAB node, a Radio Resource Control (RRC) setup request message comprising an IAB indication that indicates that the transmission to the network node is by the child IAB node comprising the IAB-MT.

2. The method of claim 1, wherein the network node is operating as a Distributed Unit (DU) with respect to the child IAB node.

3. The method of claim 2, further comprising:
   transmitting, to the network node, an acknowledgement comprising a RRCSetupComplete message.

4. The method of claim 1, wherein, based on the message, a OAM connection is established through a DU of the network node to the IAB child node.

5. A child Integrated Access Backhaul (IAB) node comprising an IAB-Mobile Termination (IAB-MT), the child IAB node comprising:
   processing circuitry configured to:
      transmit, to a network node operating as a parent node with respect to the child IAB node, a Radio Resource Control (RRC) setup request message comprising an IAB indication that indicates that the transmission to the network node is by the child IAB node comprising the IAB-MT.

6. The child IAB node of claim 5, wherein the network node is operating as a Distributed Unit (DU) with respect to the child IAB node.

7. The child IAB node of claim 5, wherein the processing circuitry is configured to:
   transmit, to the network node, an acknowledgement comprising a RRCSetupComplete message.

8. A method performed by a network node operating as a parent node with respect to a child Integrated Access Backhaul (IAB) node, the method comprising:
   receiving, from the child IAB node, a Radio Resource Control (RRC) setup request message comprising an IAB indication that indicates that the transmission to the network node is by the child IAB node comprising a IAB-Mobile Termination (IAB-MT).

9. The method of claim 8, wherein the network node is operating as a Distributed Unit (DU) with respect to the child IAB node.

10. The method of claim 8, wherein the method further comprises at least one of:
    initiating a setup of an Operations and Maintenance (OAM) connection with the child IAB node; and
    in response to receiving an acknowledgement from the child IAB node, transmitting a RRCSetupComplete message.

11. The method of claim 8, further comprising:
    in response to receiving a message from an OAM system indicating to establish the OAM connection with the child IAB node, setting up the OAM connection through a parent DU to the child IAB node.

12. The method of claim 8, further comprising:
    in response to receiving an acknowledgment from the child IAB node, transmitting a registration request to a core network.

13. A network node operating as a parent node with respect to a child Integrated Access Backhaul (IAB) node, the network node comprising:
    processing circuitry configured to:
       receive, from the child IAB node, a Radio Resource Control (RRC) setup request message, the message comprising an IAB indication that indicates that the transmission to the network node is by the child IAB node comprising a IAB-Mobile Termination (IAB-MT).

14. The network node of claim 13, wherein the network node is operating as a Distributed Unit (DU) with respect to the child IAB node.

15. The network node of claim 13, wherein the processing circuitry is configured to perform at least one of:
    initiating a setup of an Operations and Maintenance (OAM) connection with the child IAB node; and
    in response to receiving an acknowledgement from the child IAB node, transmitting a RRCSetupComplete message.

16. The network node of claim 13, wherein the network node is operating as a Central Unit (CU) with respect to the child IAB node.

17. The network node of claim 13, wherein the processing circuitry is configured to:
in response to receiving a message from an OAM system indicating to establish the OAM connection with the child IAB node, set up the OAM connection through a parent DU to the child IAB node.

18. A method performed by a network node operating as a parent node with respect to a child Integrated Access Backhaul (IAB) node comprising:
receiving, from the child IAB node, a message associated with a Radio Access Channel (RACH) procedure, wherein the message uses at least one RACH resource configured for an IAB node; and
based on the message using the at least one RACH resource configured for the IAB node, determining that the message to the network node is by the child IAB node comprising a IAB-Mobile Termination (IAB-MT).

19. A network node operating as a parent node with respect to a child Integrated Access Backhaul (IAB) node, the network node comprising:
processing circuitry configured to:
receive, from the child IAB node, a message associated with a Radio Access Channel (RACH) procedure, wherein the message uses at least one RACH resource configured for an IAB node; and
based on the message using the at least one RACH resource configured for the IAB node, determine that the message to the network node is by the child IAB node comprising a IAB-Mobile Termination (IAB-MT).

20. The network node of claim 19, wherein the network node comprises a Distributed Unit (DU).

21. The network node of claim 19, wherein the processing circuitry is configured to:
initiate a setup of an Operations and Maintenance (OAM), connection with the child IAB node without sending a RRC set up request message to the Central Unit (CU).

* * * * *